Aug. 27, 1940. L. M. POTTS Re. 21,543

LINECASTING AND COMPOSING MACHINE

Original Filed Jan. 2, 1932 13 Sheets-Sheet 1

INVENTOR
LOUIS M. POTTS
BY J. H. B. Whitfield
ATTORNEY

Aug. 27, 1940. L. M. POTTS Re. 21,543

LINECASTING AND COMPOSING MACHINE

Original Filed Jan. 2, 1932 13 Sheets-Sheet 2

INVENTOR
LOUIS M. POTTS
BY H. B. Whitfield
ATTORNEY

LINECASTING AND COMPOSING MACHINE

Original Filed Jan. 2, 1932 13 Sheets-Sheet 3

INVENTOR
LOUIS M. POTTS
BY H. B. Whitfield
ATTORNEY

LINECASTING AND COMPOSING MACHINE

Original Filed Jan. 2, 1932 13 Sheets-Sheet 4

INVENTOR
LOUIS M. POTTS

H. B. Whitfield
ATTORNEY

LINECASTING AND COMPOSING MACHINE
Original Filed Jan. 2, 1932 13 Sheets-Sheet 5
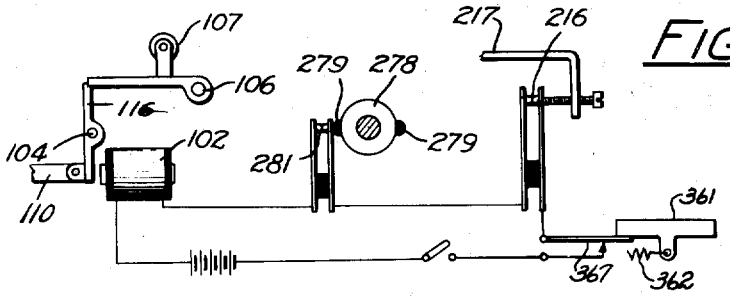
FIG. 5a
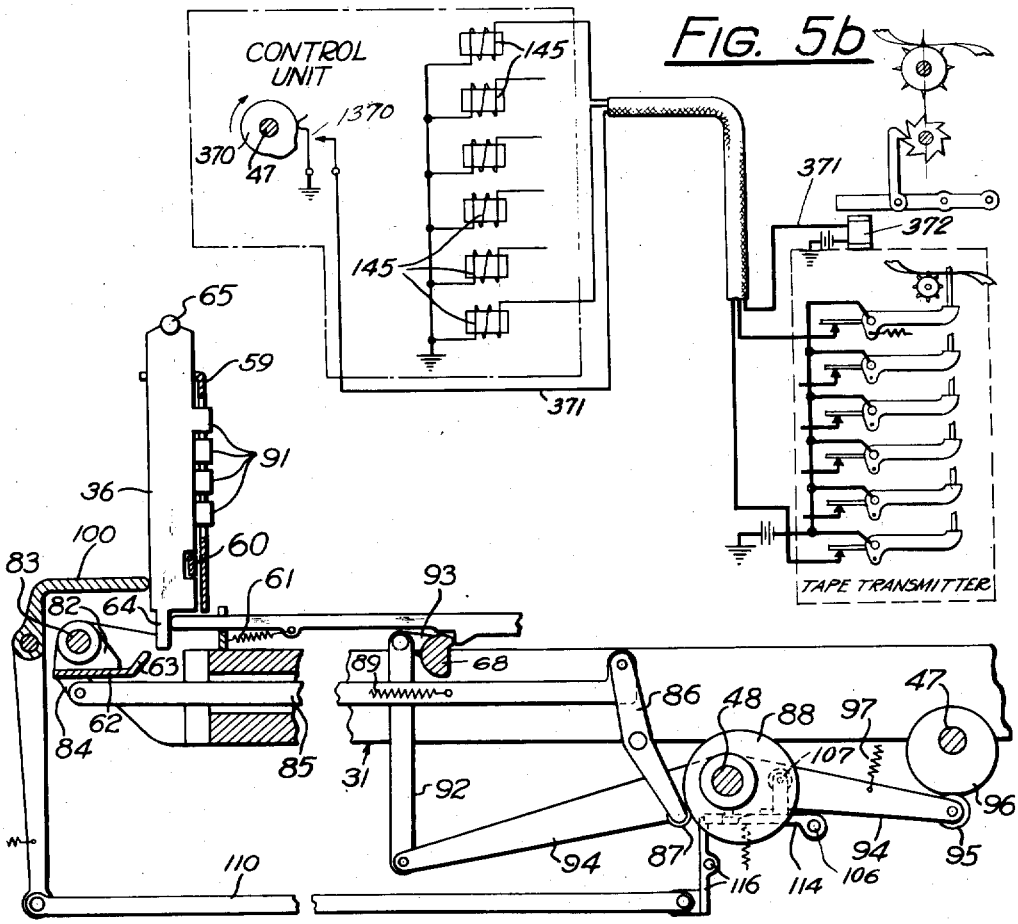
FIG. 5b
FIG. 7
INVENTOR
LOUIS M. POTTS
BY H. B. Whitfield
ATTORNEY

LINECASTING AND COMPOSING MACHINE

Original Filed Jan. 2, 1932 13 Sheets-Sheet 6

INVENTOR
LOUIS M. POTTS
BY H. B. Whitfield
ATTORNEY

LINECASTING AND COMPOSING MACHINE

Original Filed Jan. 2, 1932 13 Sheets-Sheet 7

INVENTOR
LOUIS M. POTTS
BY H. B. Whitfield
ATTORNEY

LINECASTING AND COMPOSING MACHINE

Original Filed Jan. 2, 1932 13 Sheets-Sheet 8

INVENTOR
LOUIS M. POTTS
BY H. B. Whitfield
ATTORNEY

LINECASTING AND COMPOSING MACHINE

Original Filed Jan. 2, 1932 13 Sheets-Sheet 9

INVENTOR
LOUIS M. POTTS
BY H. B. Whitfield
ATTORNEY

LINECASTING AND COMPOSING MACHINE
Original Filed Jan. 2, 1932 13 Sheets-Sheet 10
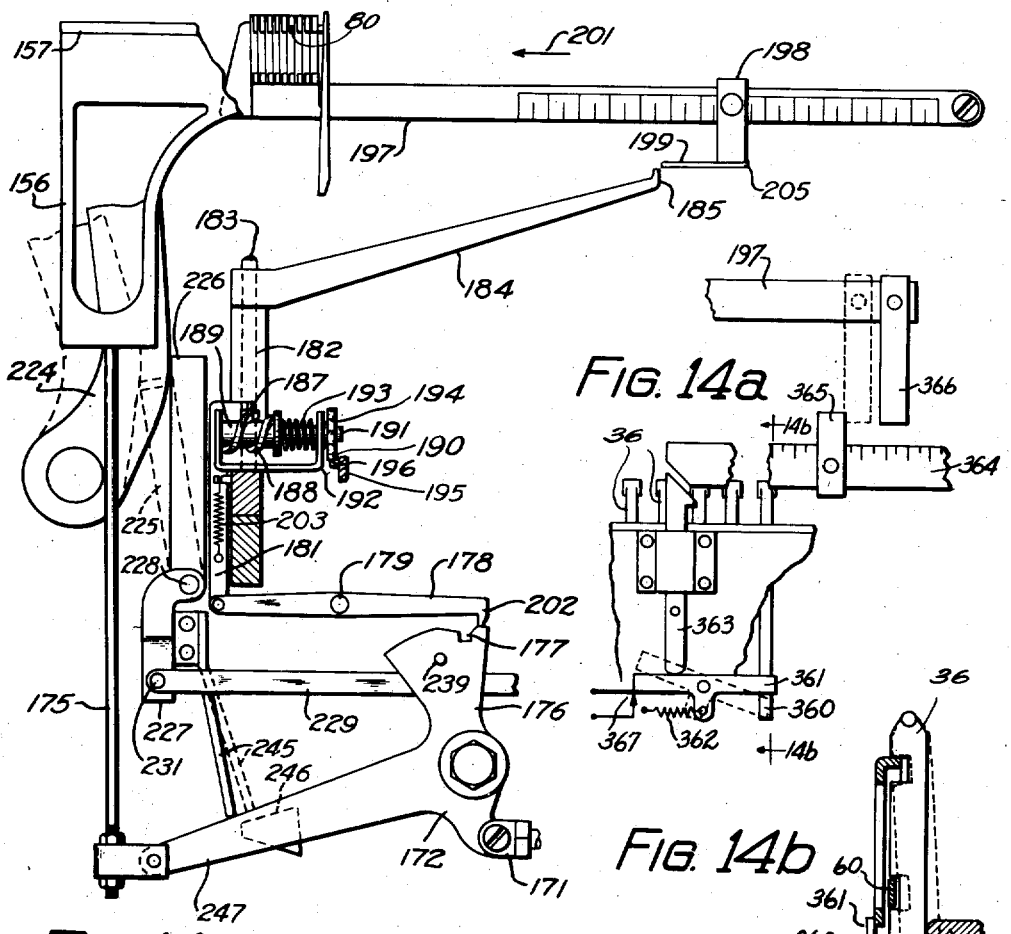
FIG. 14
FIG. 14a
FIG. 14b
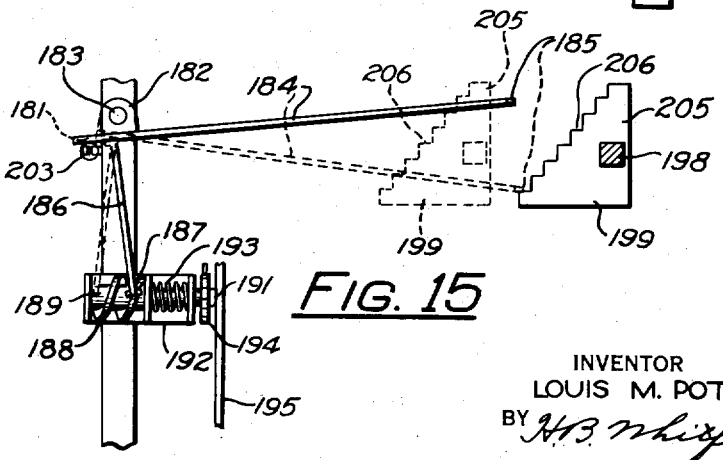
FIG. 15
INVENTOR
LOUIS M. POTTS
BY H. B. Whitfield
ATTORNEY

LINECASTING AND COMPOSING MACHINE

Original Filed Jan. 2, 1932 13 Sheets-Sheet 11

INVENTOR
LOUIS M. POTTS
BY H. B. Whitfield
ATTORNEY

LINECASTING AND COMPOSING MACHINE

Original Filed Jan. 2, 1932 13 Sheets-Sheet 12

INVENTOR
LOUIS M. POTTS
BY J. H. B. Whitfield
ATTORNEY

LINECASTING AND COMPOSING MACHINE
Original Filed Jan. 2, 1932 13 Sheets-Sheet 13
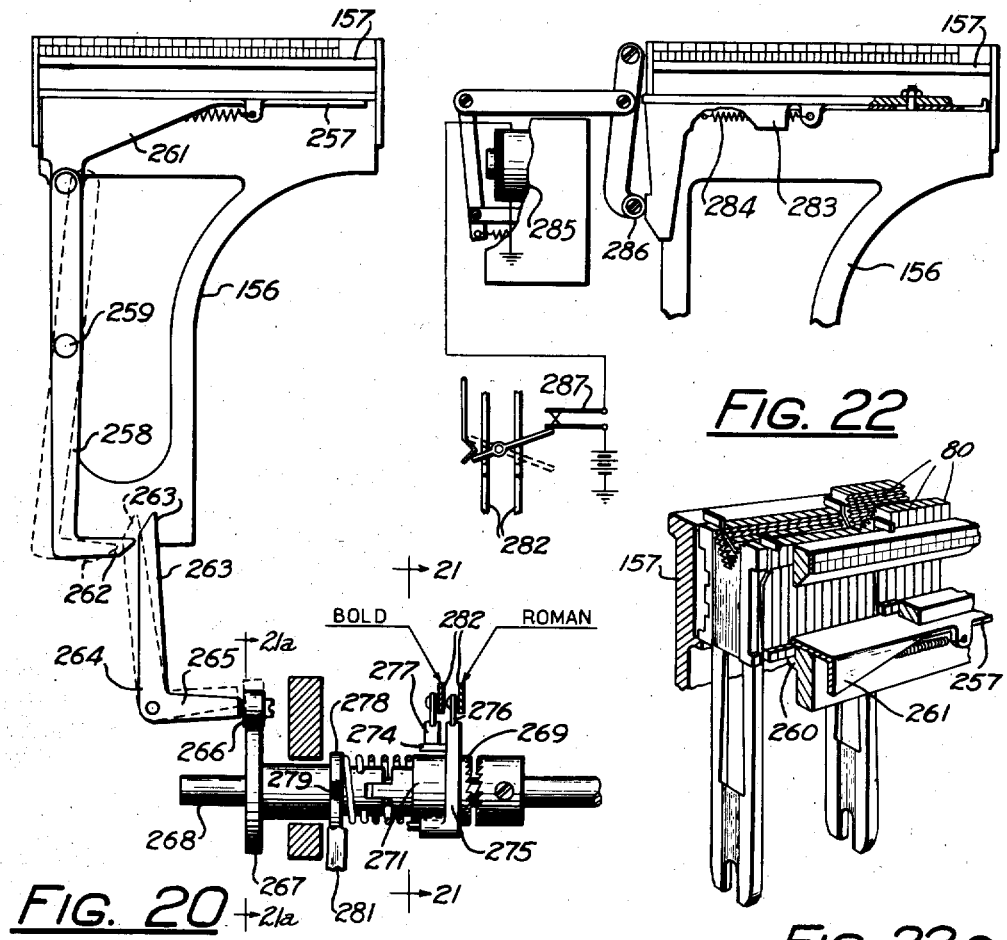
FIG. 20
FIG. 22
FIG. 22a
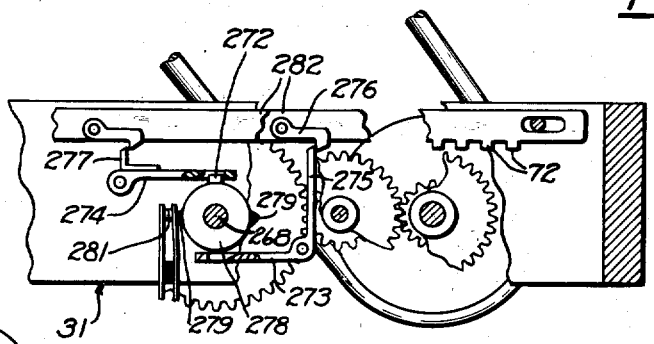
FIG. 21
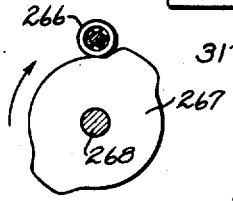
FIG. 21a
INVENTOR
LOUIS M. POTTS
BY H. B. Whitfield
ATTORNEY Reissued Aug. 27, 1940

Re. 21,543

UNITED STATES PATENT OFFICE 21,543

LINECASTING AND COMPOSING MACHINE

Louis M. Potts, Evanston, Ill., assignor, by mesne assignments, to Teletypesetter Corporation, a corporation of Delaware Original No. 2,057,652, dated October 13, 1936, Serial No. 584,387, January 2, 1932. Application for reissue October 4, 1938, Serial No. 233,337

76 Claims. (Cl. 199—18)

This invention relates to line casting and composing machines and particularly to mechanisms for operating and controlling such machines.

An important object of this invention is the provision of a comparatively simple, reliable and sturdy mechanism for the automatic control of line casting machines, which may be readily applied to commercial line casting and composing machines without material alterations of said machines and without impairing their use as manual controlled devices.

Other objects of this invention are such as will appear in the course of the following description and in the hereunto appended claims and include the novel combinations and subcombinations hereinafter described.

For convenience in description, the commercial line casting machines upon which the present invention may be applied will be referred to hereinafter as the principal machine while the present invention will be referred to as the control unit or appliance.

The unit comprises generally a signal controlled mechanism that is responsive to either various permutations of transverse perforations of a control tape or to corresponding electrical impulses and a selector mechanism that is responsive to the signal controlled mechanism and operates to select one of a plurality of matrix or function bars. Actuating mechanism deriving its power from the principal machine functions to move the selected one of the plurality of bars whereby the latter is made to complete the particular performance for which it was selected. Certain of the plurality of bars are adapted to release matrices from the storage magazine of the principal machine and certain others of them are adapted to execute special functions such as to initiate the movement of the assembling elevator of the principal machine or to control functions in the control unit itself.

Line casting machines are characteristically complex mechanisms and may therefore be subjected to relatively high factors of error during given periods of operation. The structure of the present invention has been provided with several safety devices whereby, in the event of any irregular operation or disorder, such as, for example, jamming of matrices in transit or premature elevator operation, the transmission of operating signals by a record reader is automatically suspended and remains so until a local supervisor manually restores the machine to proper operating condition.

The unit is preferably equipped with control mechanism already referred to, whereby the machine may be operated from a remote electrical signaling source, as by the use of selector mechanism as disclosed fully in Patent No. 1,970,567, issued August 21, 1934. A removable keyboard which may be conveniently installed above the selector bars is also provided so that in the event it is desired to manually operate a line casting machine equipped with the present invention this may be done without interfering with the automatic control mechanism.

It will be observed that the installation of the present invention upon a standard line casting machine, such as the commercially well known machines, involves but slight adaptations or changes from the standard equipment provided with either of these devices. The space occupied by this mechanism is but slightly greater than that occupied by the standard manual keyboard. Thus, the conversion of a manually controlled device to one which is automatically controlled requires but slight sacrifice of space.

Certain variations exist in the manner in which some special functions are manually performed in several different models of standard line casting machines. The present invention, while generally adaptable to the several of these models, varies specifically in some of its details of attachment. However, the selection mechanism of the present device as well as the timing arrangement of certain of its essential parts are so versatile in design that the same equipment may be adapted to control any of several standard models.

A better understanding of the present invention may be obtained from the following description taken in conjunction with the accompanying drawings wherein, Fig. 1 is a perspective view of a principal machine with parts eliminated showing the application of the present invention thereto.

Figures 4, 4A, 5:
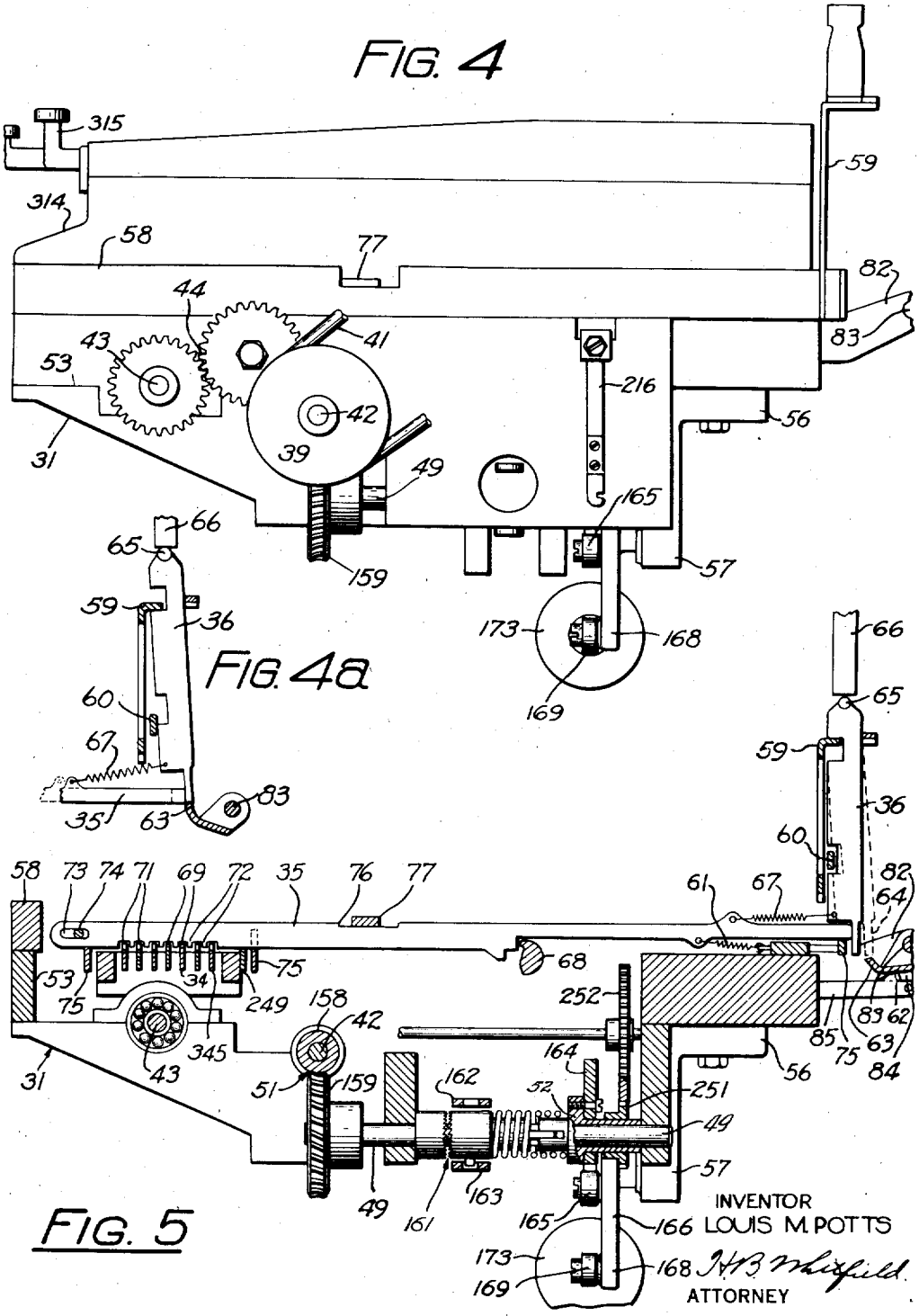
Fig. 4 is a right side elevational view of the keyboard mechanism with parts broken away.

Fig. 4*a* is a detail sectional view illustrating a push bar in actuated position.

Figure 2:
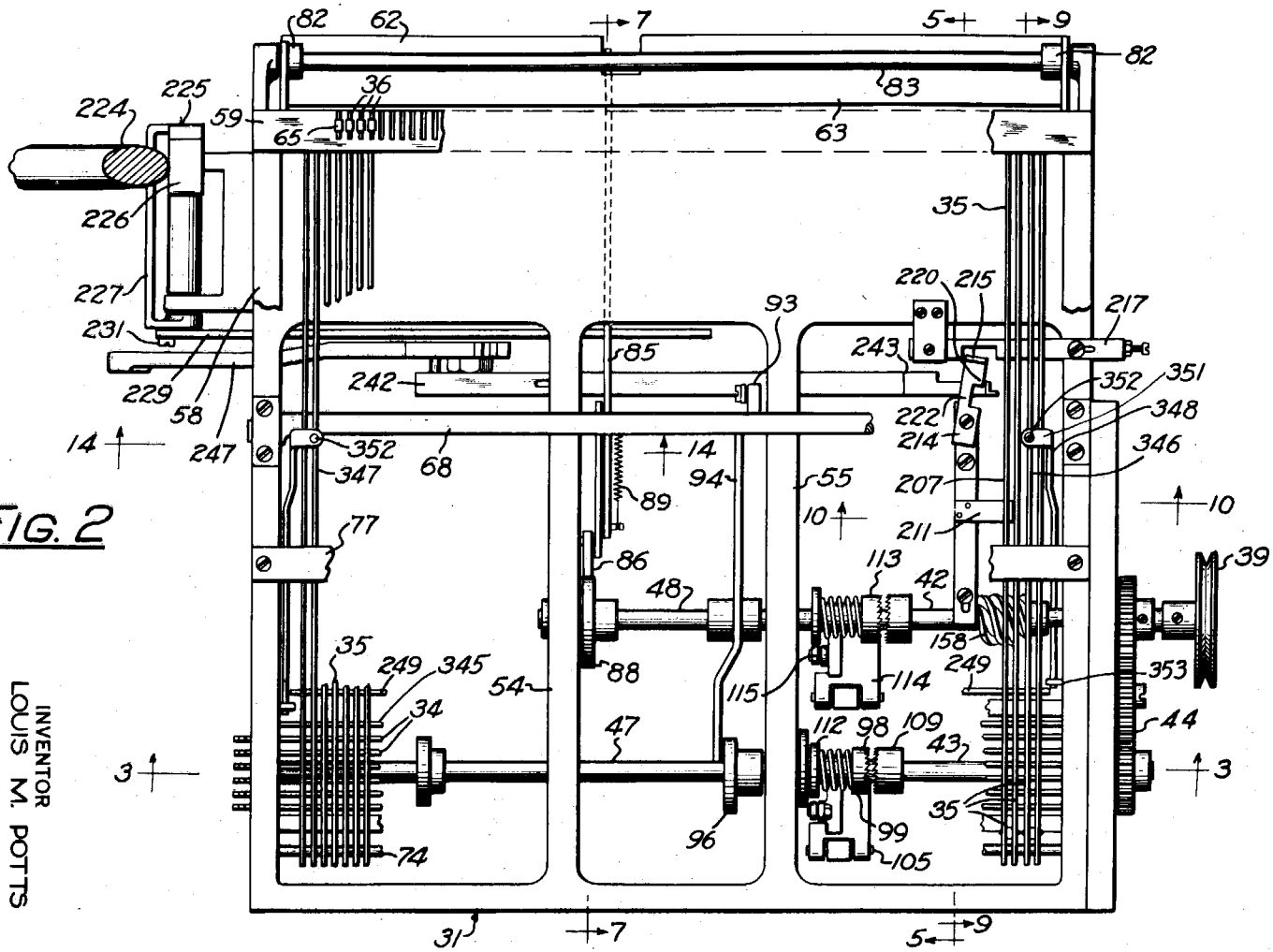
Fig. 2 is a plan view of the keyboard control mechanism with certain parts broken away.

Fig. 5 is a sectional view taken approximately on line 5—5 of Fig. 2.

Fig. 5*a* is a diagram of a simple control circuit used in coordinating the several parts of the present invention.

Fig. 5*b* is a circuit diagram illustrating a method of operation featuring a system for electrically controlling a line casting machine.

Figure 6:
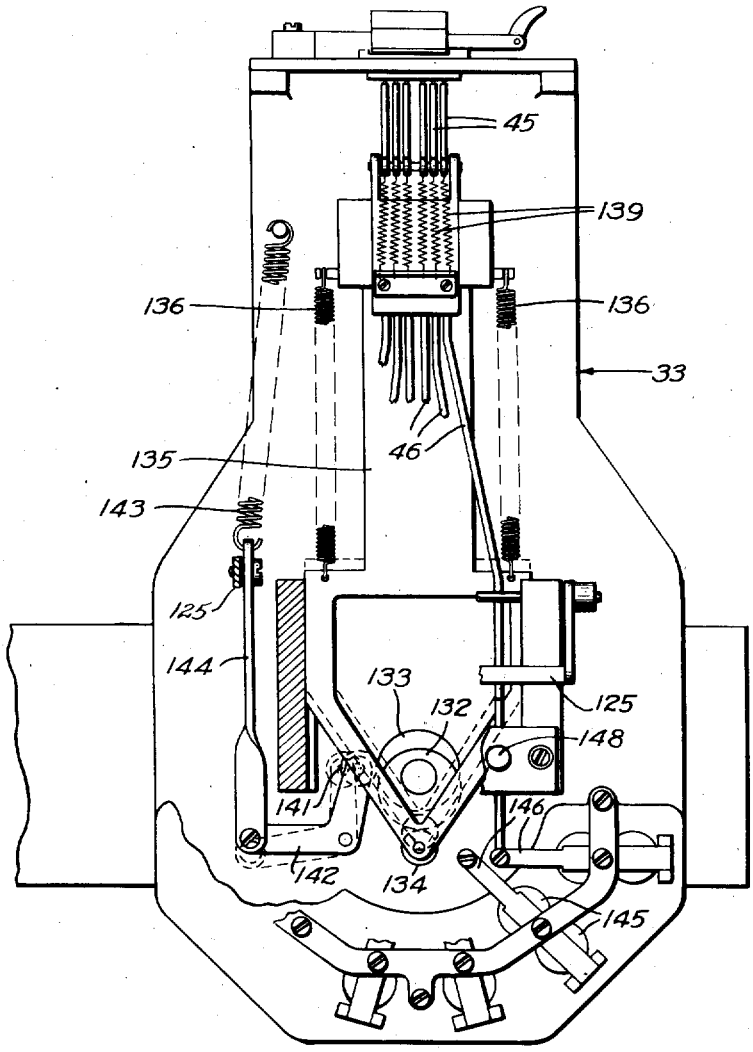

Fig. 6 is a side elevational view with parts broken away illustrating the record reader.

Fig. 7 is a sectional view taken approximately on line 7—7 of Fig. 2.

Figure 8:
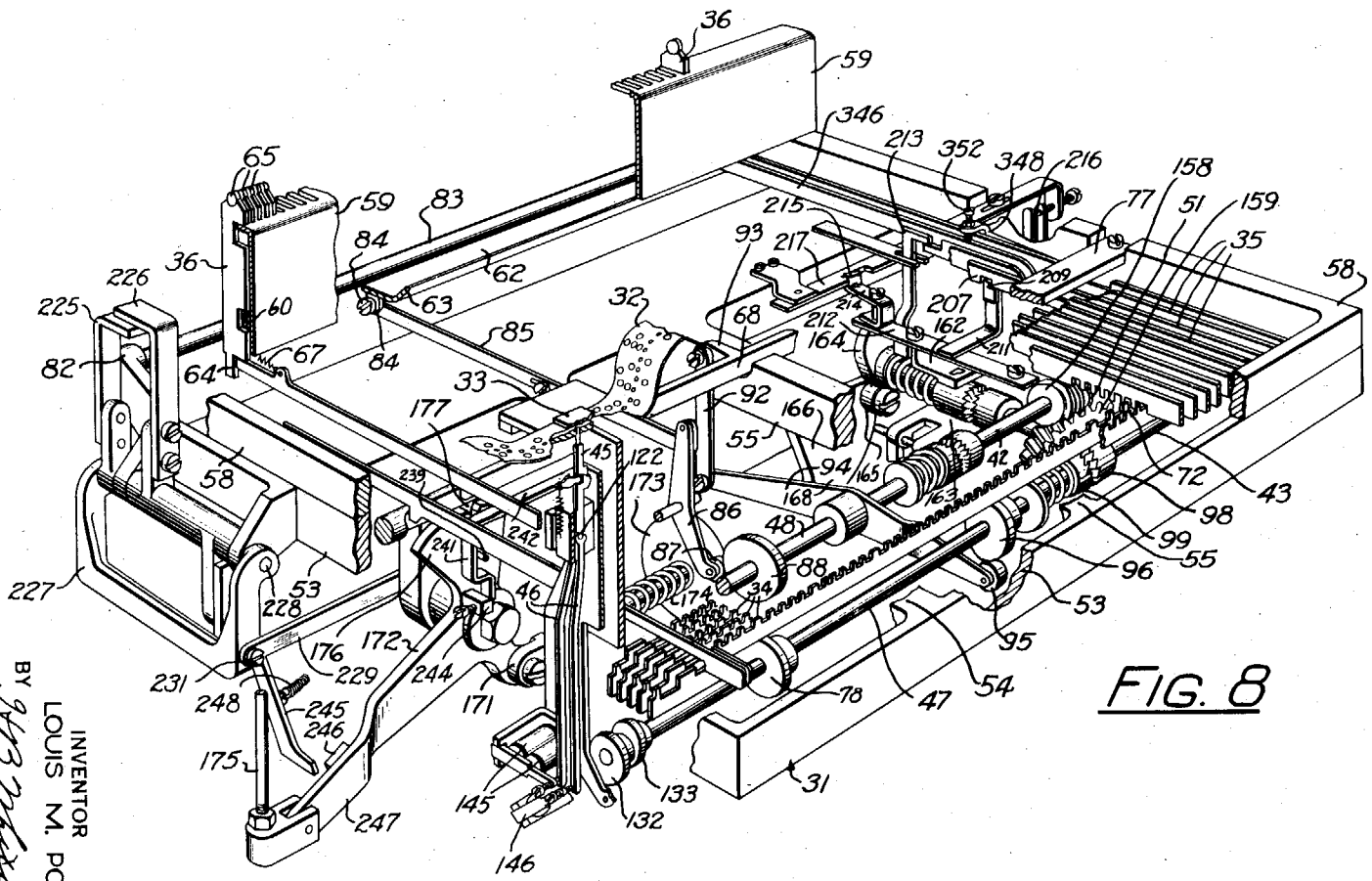

Fig. 8 is a perspective view of the control mechanism with parts broken away.

Figure 9:
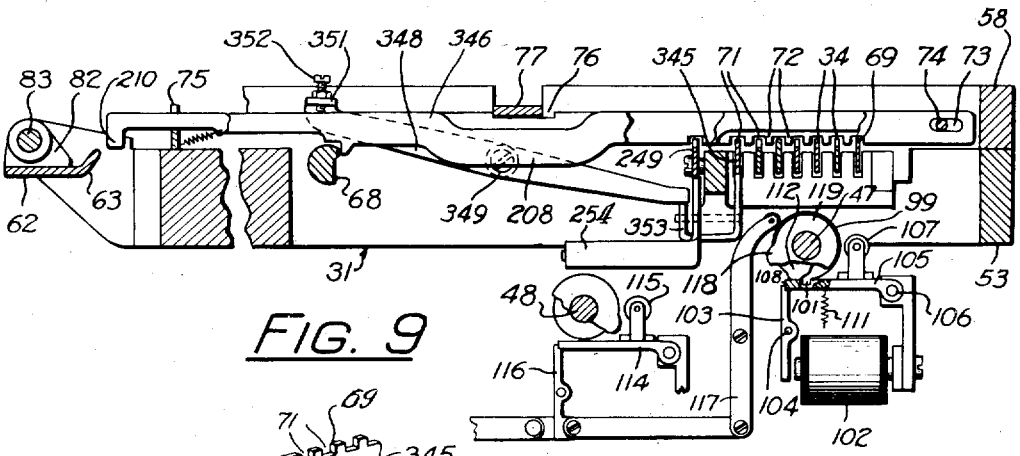

Fig. 9 is a detail sectional view taken approximately on line 9—9 of Fig. 2.

Figure 9A:
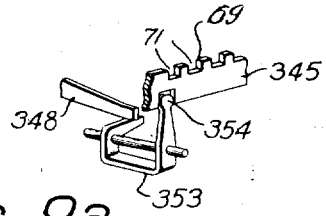

Fig. 9*a* is a fragmentary perspective view illustrating the seventh bar shift mechanism.

Figure 10:
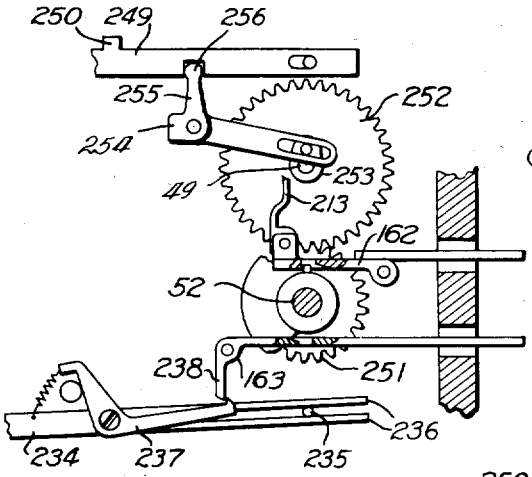

Fig. 10 is a detail sectional view of the automatic channel shift mechanism and is taken approximately on line 10—10 of Fig. 2.

Figure 11:
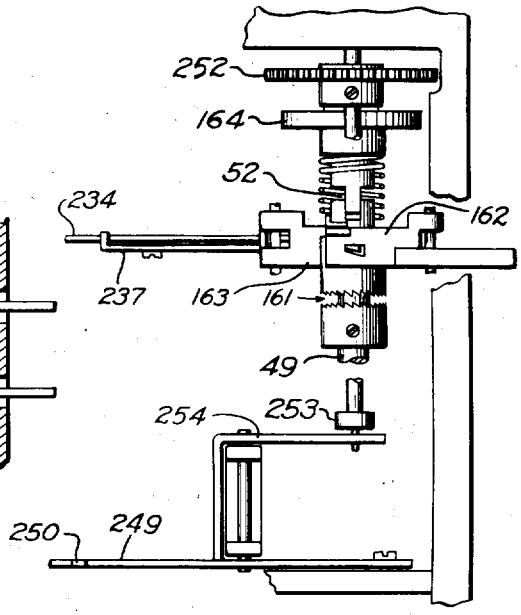

Fig. 11 is a detail plan view of the channel shift mechanism.

Figures 12, 13:
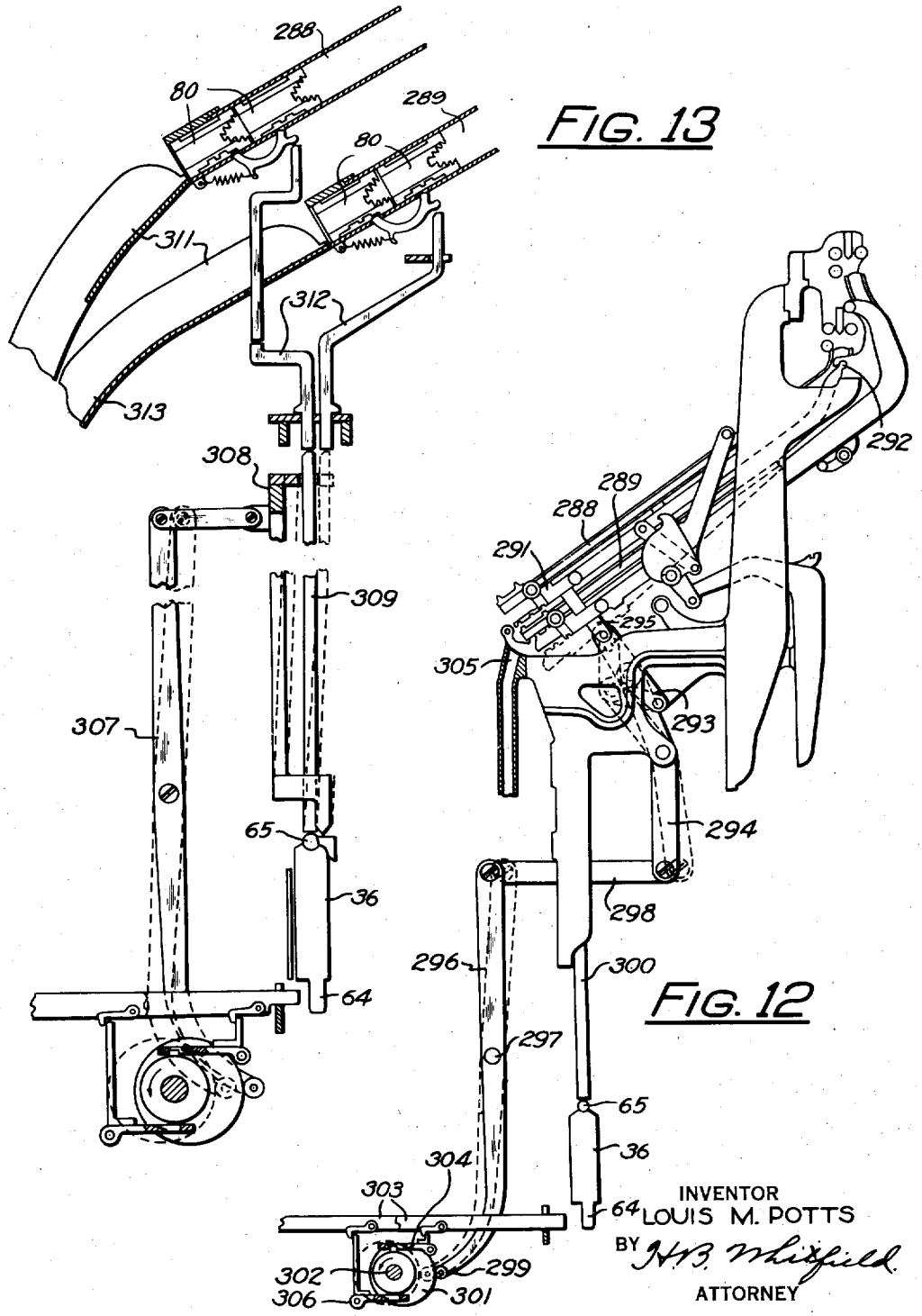

Fig. 12 is a transverse sectional detail view illustrating one form of application of a magazine shift mechanism.

Fig. 13 is a transverse sectional detail view similar to Fig. 12, but somewhat enlarged illustrating a modified application of a magazine shift mechanism.

Fig. 14 is a detail sectional view taken approximately on line 14—14 of Fig. 2 illustrating a short-long line interceptor device.

Fig. 14*a* is a fragmentary detail elevation of a mechanism for quadding out a line in response to a single signal.

Fig. 14*b* is a sectional view taken on line 14*b*—14*b* of Fig. 14*a*.

Fig. 15 is a detail plan view of the short-long line interceptor illustrated in Fig. 14.

Figures 16, 17:
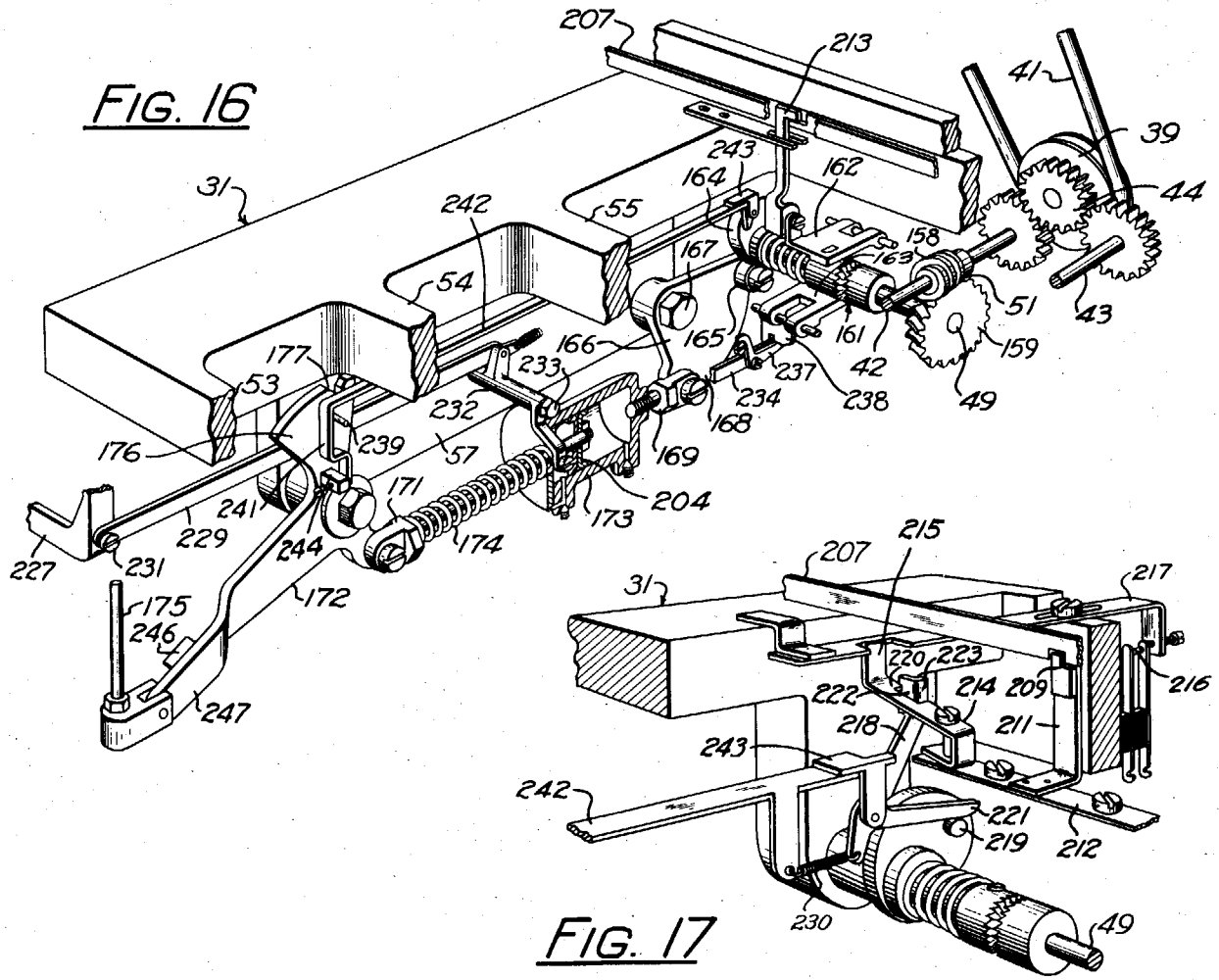

Fig. 16 is a perspective view with parts broken away showing the assembling elevator control mechanism.

Fig. 17 is a perspective view of a circuit breaker mechanism.

Figure 18:
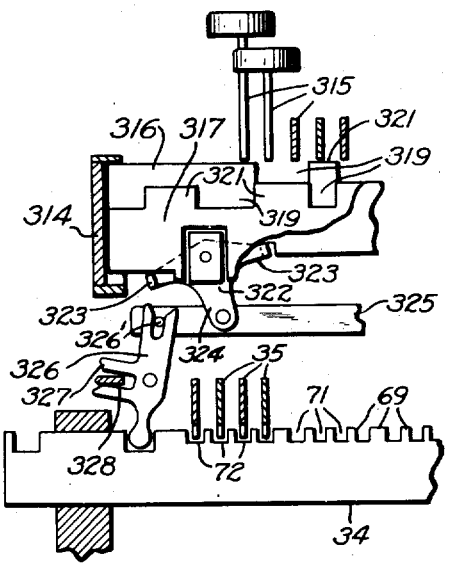
Figure 19:
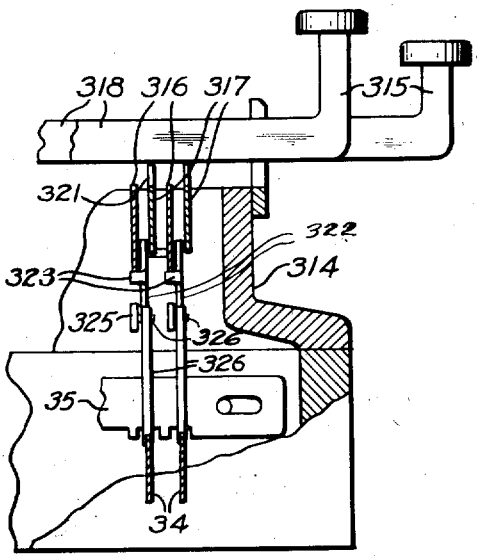

Figs. 18 and 19 are detail sectional views of the removable keyboard.

Fig. 20 is a detail sectional view illustrating a feature of the present invention for determining the rail of the assembling frame upon which subsequently selected matrices shall assemble.

Fig. 21 is a sectional view taken approximately on line 21—21 of Fig. 20.

Fig. 21*a* is a detail sectional view taken on line 21*a*—21*a* of Fig. 20.

Fig. 22 is a detail view of a modified form of the invention illustrated in Fig. 20.

Fig. 22*a* is a perspective view of an assembler block with parts broken away to show the operation of the movable shift rail.

Figure 23:
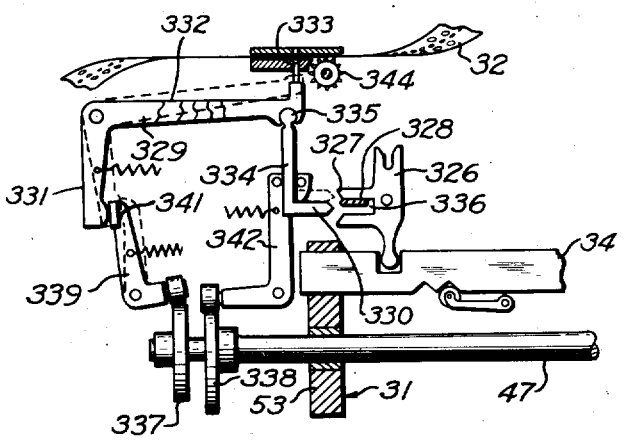

Fig. 23 is a detail sectional view illustrating a modified form of record reader.

Figure 1:
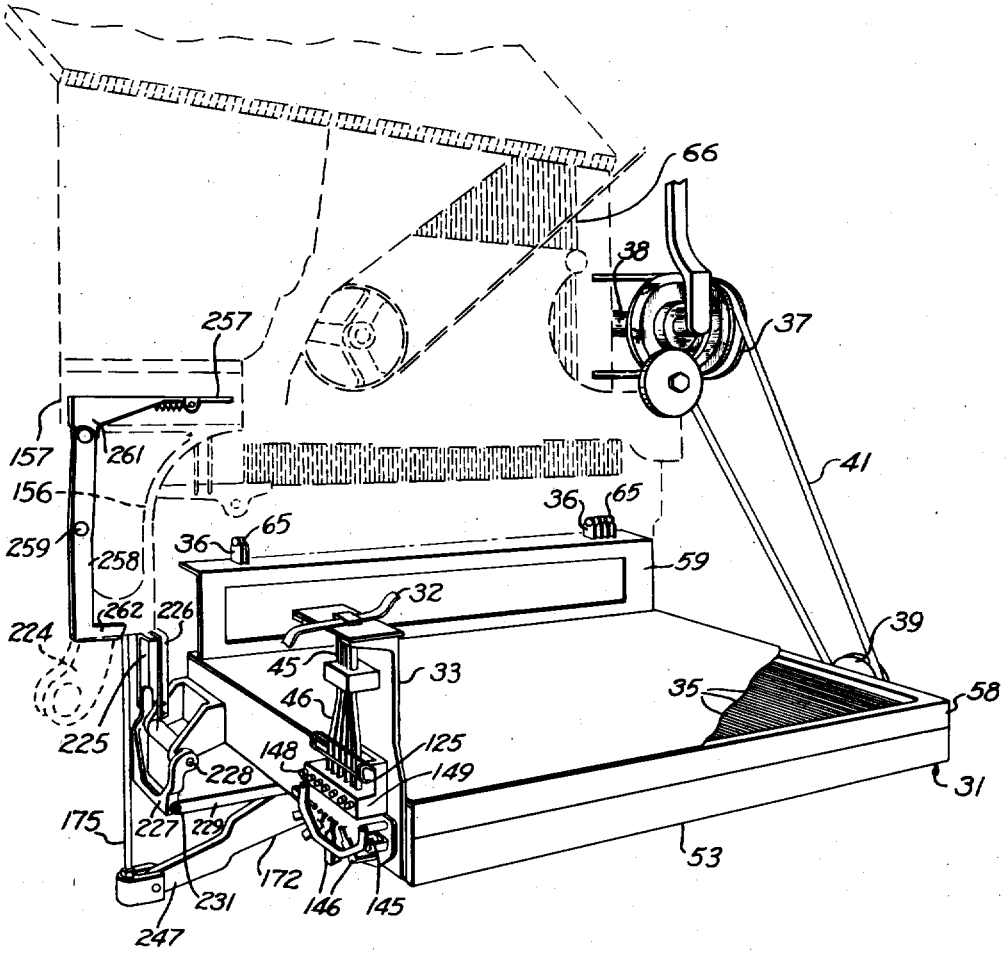

Referring to the drawings in which like reference characters designate similar parts throughout the drawings, Fig. 1 illustrates generally frame work 31 of the appliance comprising the present invention, as well as several of the prominent operating mechanisms. The preferred mode of control for this invention is by a perforated record strip 32 which may be prepared by suitable perforating mechanism in the manner fully described in Patent No. 2,000,029, issued May 7, 1935. After preparation, the tape 32 is fed through a record reader 33 in a step-by-step manner whereby each transverse row of perforations is mechanically translated to a corresponding positionment of code bars 34 (Fig. 2). In accordance with each such positionment of the code bars 34, the selector bar 35 individual to the particular code perforations in the tape is released into operative relation with a push bar 36 which is in turn actuated to effect the release of a selected matrix or to perform a special function depending on the character of the selection.

Figure 3:
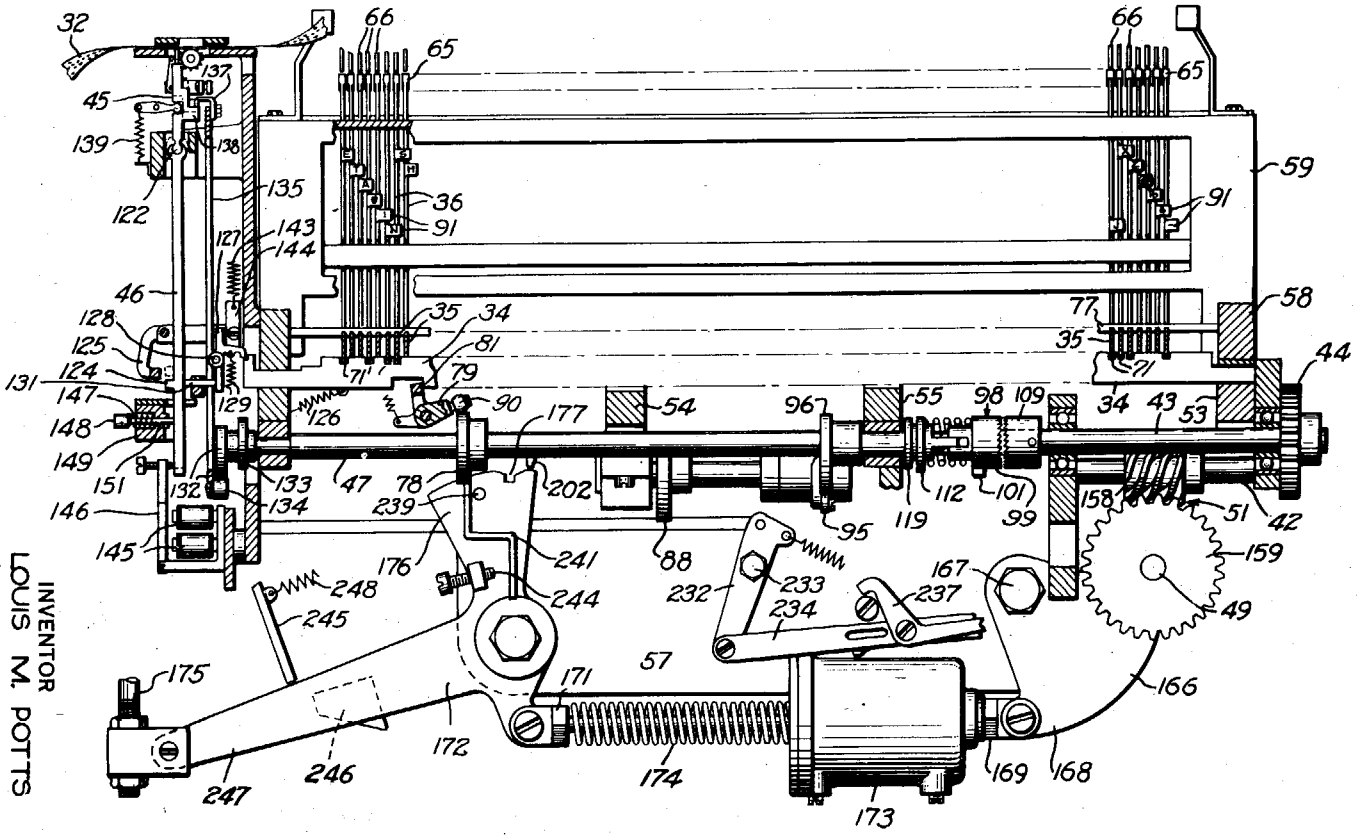
Fig. 3 is a sectional view taken approximately on line 3—3 of Fig. 2.

The record reader 33 carries a set of feelers 45 each of which registers opposite one of the perforations of a transverse row. The feelers 45 and their associated tail rods 46 are spring urged to assume the dotted line position as indicated in Fig. 3 when permitted to do so by the occurrence of a hole in the particular position of the tape 32. When, however, no hole is presented the elements 45 for those particular positions across the tape remain in the solid line position as shown.

The unit derives all of its operating power from the principal machine through the medium of a driving pulley 37 attached to the intermediate shaft 38 which drives pulley wheel 39 by means of a belt 41. Pulley wheel 39 is secured to a main drive shaft 42 which is constantly rotated during the time that the principal machine is in operation and which transmits a similar, but somewhat slower motion to an auxiliary drive shaft 43 by means of the gear train 44. The ratio between the driving pulley 37 and the driven pulley 39, or in other words, the speed at which the control unit may be operated, is dependent upon the speed at which the principal machine is capable of being operated.

The record reader mechanism is operated by a cam shaft 47 which is an extension of the auxiliary drive shaft 43. Main drive shaft 42 has an extension shaft 48, while a stub drive shaft 49 gear driven as at 51 from the main drive shaft 42 is provided with a cam sleeve 52 (Fig. 5). Thus is indicated in a general way the distribution of the driving and operating power.

Referring especially to Figs. 2, 3 and 5 attention is directed to the frame structure 31 having a rectangular portion 53 which may be secured to the keyboard supporting base of the standard line casting machine. Two transverse ribs 54 and 55 serve to support some of the mechanism as well as to reinforce the rectangular portion 53. At the rearward side of the frame 31 and securely fastened thereto is an angular bracket 56 having a depending portion 57.

Another rectangular frame 58 superimposed upon the rectangular portion 53 of the frame 31 is provided at its rearmost side with an upright bracket 59. As is best indicated in Fig. 5 this frame 58 serves as a supporting fixture for the selector bars 35 while the bracket 59 correspondingly maintains the push bars or weights 36 in a position at one end and above the inner extremities of the selector bars. For each movement of the code bars 34 in varying combinations, as they are controlled by the record reader 33, one of the selector bars 35 is urged into its dotted position, as indicated, by the action of an associated spring 61 (Fig. 5).

*Selector mechanism*

This movement of a bar 35 displaces the push bar 36 corresponding to it so as to cause it to assume the dotted line position indicated. When, after this has happened, a bail 62 makes its next oscillation the control of which will be more fully described hereinafter, its upturned lip 63 engages the depending leg 64 of the bar 36 thus displaced, and pushes it upwardly until its abutment lobe 65 engages and actuates a corresponding matrix release reed 66. A clear showing of the mechanical connection between the release reeds 66 and various standard matrix release mechanisms is shown in Figs. 12 and 13. Upon the return movement of the bail 62 the push bar 36 is permitted to gravitate back to its normal position, augmented to some extent by spring 67 which primarily serves to pull it inwardly toward its solid line position and also by springs individually associated with the release reeds 66 of the principal machine. Before this occurs the selected bar 35 is restored to its solid line position by a restoring cam rod 68 and is thus held momentarily until a new positionment of the code bars 34 blocks it by interposing projections 69 instead of an alignment of notches 71 in the path of movement of its teeth 72. An overlap is afforded between the operation of the push bars 36 and their respective selector bars 35 which corresponds to the overlap provided by the well known cam and rubber roller release means of the commercial linecasting machines. The present construction is a more accurate and positive performance, however, and is effective as follows. When upon the selective movement of a bar 35 a push bar 36 is displaced and is raised into actuating position as shown in Fig. 4a it is maintained in this position by the engagement of bar 60 with its forward edge thereby permitting its corresponding selector bar 35 to be reset preparatory to the next selection. The spring 67, comprising a universal coupling between the selector and push bars, does not interfere with the independent action of either of them.

Each of the several selector bars is confined to a limited, longitudinal and parallel movement by having at its foremost end an elongated slot 73 through which is placed a rod 74, and by having at several points throughout its length transverse supporting combs 75. The forward movement of the bars 35 is definitely limited by the abutment of its shouldered portion 76 and the forward edge of the transverse bar 77.

The code bars 34 are reset to a normal position (Fig. 3) at each rotation of the cam shaft 47. As cam 78, which is secured to shaft 47, makes a rotation it permits bell crank 79 to respond to the urge of its spring by presenting the nadir or low part of its cam surface to the roller 80, but with the continued rotation of the shaft 47 a rise in the cam 78 returns the bell crank 79 and its resetting bail 81, to its extreme left hand position, thereby permitting of a new selection of the code bars 34. Thus, since the shaft 47 makes a complete revolution in response to each signal, the cam 78 operates to reset the code bars at the same frequency.

With particular reference to Figs. 7 and 8 attention is again directed to the lifting bail 62 whose function, as described above, is to lift the push bars 36 as they are selected so that they operate corresponding matrix release reeds 66, Fig. 1. At each end of the bail 62 is an ear 82 through which passes a rocker shaft 83 secured to said ears, and intermediate the ends is a pivot lug 84 to which is connected a link 85. A lever 86 is pivotally mounted on the transverse rib 54 of the framework and is pivotally articulated to the other end of the link 85. The free end of the lever 86 carries a cam roller 87 which follows the peripheral surface of cam 88 as it is rotated by the cam shaft 48 and imparts thereby a reciprocal motion to the lifting bail 62. Spring 89 acting upon the link 85 maintains the roller 87 constantly against its cam 88.

In the preferred construction of the push bars 36 each is equipped with an extending lug 91, Fig. 3 upon which is indicated the particular letter to which it pertains. In this manner there is provided a convenient mode of manually controlling the machine in the absence of the removable keyboard, since it would then be necessary only to displace the desired push bars by hand which may be done by pushing the lug 91 thereof.

The cam rod 68 is pivoted at its extremities which are suitably journalled in the framework. A link 92 is pivotally connected to an ear 93 integral with the cam rod 68 and at its opposite end is pivotally articulated to a first class lever 94 which is freely mounted on shaft 48. The opposite end of the lever 94 carries a cam roller 95 disposed to engage the peripheral edge of cam 96 of the cam shaft 47. Spring 97 urges the cam roller 95 against cam 96 and in cooperation with it imparts a timed, reciprocal movement to the cam rod 68.

Reference is again made to Fig. 2. As already indicated, shafts 47 and 48 are extensions of shafts 43 and 42, respectively. Shaft 43 is adapted to be coupled with extension shaft 47 through the medium of a spring urged tooth clutch 98 the slidable member 99 of which carries a disengaging cam projection 101 illustrated in Fig. 9. A release electro-magnet 102 is mounted below the clutch, and an armature 103 pivoted at 104 is adapted to be influenced by electro-magnet 102. A lever 105 pivoted at 106 carries a setting roller 107 and is provided with a suitable cam engaging portion 108 which is adapted to lie in the path of the projection 101 as it is revolved and to engage a beveled side thereof so that by the camming action of the lever 105 upon the projection 101 the slidable member 99 of the clutch is thereby disengaged from the secured member 109. The lever 105 is normally held in position to disengage the clutch 98, as indicated in Fig. 9, by the armature 103, but upon the energization of the electro-magnet 102 the armature 103 is moved out of position and the lever 105 is permited to yield to the influence of its spring 111 and be moved out of engagement with the cam projection 101. After the armature 103 is released by its magnet, the continued rotation of the shaft 47 carries cam 112 into engagement with the resetting roller 107 of the lever and working against the action of spring 111, resets the lever to its normal and engagement positions where it is so held by the armature 103.

The shaft 42 maintains a driving engagement with shaft 48 through the medium of a tooth clutch 113 which is similar to clutch 98 just described. The release of the movable member of this clutch whereby is effected its engagement with the secured member, is mechanically controlled from the aforementioned shaft in the following manner. This clutch is provided with a lever 114 Fig. 9 carrying a resetting roller 115 operative in the same manner as the lever 105 and roller 107 of the clutch 98. Instead of an armature, however, there is a simple lever 116 pivotally linked to a trigger 117 one end of which is disposed in the path of rotation of apex 118 of a release cam 119 on shaft 47. This cam is so positioned on its shaft that shortly after it is started into rotation it engages the trigger 117 to correspondingly release shaft 42 for rotation, but since this latter shaft has a somewhat higher speed of rotation the two are brought to stop position at the end of each revolution at nearly the same time. Thus it will be understood that shaft 47 is controlled by the magnet 102 and that shaft 48 is controlled from shaft 47.

When the unit is to be operated by hand as explained above in connection with the push bar lugs 91, the shaft 48 is released by a special arrangement. In that case the movement of a push bar 36 rocks a universal bar 100 Fig. 7 which is connected to the lever 116 by a link 110. Thus the shaft 48 is released to rotate and to effect the movement of the bail 62.

From the foregoing description it should now be clear how that part of the mechanism operates that relates to the release of matrices from their storage magazines, but for purposes of organizing the several functions involved the operation will again be summarized in connection with the following description.

Let it be assumed that a set of transverse perforations in the tape 32 has presented itself over the record reader feelers 45. In accordance with each hole or absence thereof the corresponding feeler 45 will assume an elevated position or remain in a depressed position as shown in Fig. 3. Since each feeler 45 has connected to it, by disc and socket connection as at 122, a rod 46, the latter assumes a corresponding position. Each of these rods 46 has integrally therewith a lug 124 adapted, when the rod 46 is up, to present itself into the path of the oscillating hammer bail 125. As viewed in Fig. 3 the code bars 34 are each urged to the left by individual coil springs 126. A trigger lever 127 pivoted at 128 is provided for each bar 34 to lock it in its extreme right position, but when operated by counterclockwise rotation against the action of its spring 129, it permits the movement of its code bar 34 as influenced by the spring 126. A pin 131 is provided for each trigger lever 127 and is adapted to transmit the lateral movement of an associated one of the rods 46 thereto.

In this manner those rods 46 which are in the upward position pursuant to a particular code combination of perforations and present their lugs into the path of the hammer bail 125 will be pivoted, by the impact of said bail, about their connection 122 and will through the pins 131 impart a corresponding movement to the trigger levers 127 thereby releasing the code bars 34 thereof. The remaining rods not being in position to be engaged by the hammer bail 125, their corresponding code bars remain in their right hand position.

On the left end of shaft 47 are two cams 132 and 133. As also indicated in Fig. 3 the cam 132 engages a roller 134 carried by a vertically sliding support 135 supported in the record reader frame and in cooperation with the springs 136 (Fig. 6) imparts a reciprocating movement to said support. The upper end of the support 135 carries a bracket 137 which engages the projecting portions 138 of the feeler levers 45 and on its downward movement it carries all of the feelers with it. On its upward movement the bracket permits the feelers to rise in response to the urge of their individual springs 139 and to position themselves in accordance with the perforations in the tape 32.

The other cam 133 acts upon a roller 141 of a bell crank 142, Fig. 6, and is opposed by a spring 143 connected to a link 144 which is pivoted to the bell crank 142. The hammer bail 125 is connected to the link 144 and in this manner receives reciprocal motion.

It will be noted from Fig. 3 that the lower ends of the rods 46 extend below the point at which the lug and pin engagement is located. This is provided for the purpose of additional control. Thus, a set of signal magnets 145 each having an armature 146 are so disposed that the movement of said armatures causes a corresponding movement of the rods 46. In this manner electrical signals transmitted from a suitable source such as the tape transmitter illustrated in Fig. 5b may be made to control the device in a manner generally similar to that described above.

Spring loaded plungers 147 having push button terminals 148 at the outer ends thereof are supported in a block 149. They are so spaced that the opposite ends 151 thereof abut the rods 46, each to each, so that by depressing any of these plungers one may impart the same movement to said rods 46 manually that may be produced electrically or mechanically in either of the methods aforementioned. This mode of operation is intended as a convenience for testing, adjusting or correcting errors in connection with the foregoing methods of operation.

No matter which of the several methods of actuating the record reader mechanism may be used, the subsequent operations are the same. In all cases a definite positionment is effected upon the several code bars 34. This results in the alignment of a transverse row of notches 71 Figs. 5 and 9 in the several code bars and the movement to the right of a selector bar 35 into the particular alignment when permitted to do so by the clockwise oscillation of the cam rod 68 as best illustrated in Fig. 5. This movement is urged by the individual spring 61 and continues until the shoulder 76 abuts the transverse bar 77 whereupon the corresponding push bar 36 is displaced to assume the position indicated in dotted lines. At this time the bail 62 revolves clockwise and its lip 63 hitting the depending leg 64 thrusts the bar 36 upwardly to actuate the matrix release reed 66.

Following this a matrix 80 is released from its magazine in the usual manner, with which the art is well acquainted, and forthwith discharged into the chute leading to an assembling elevator 156 Fig. 1. Upon this elevator there is carried an assembly block 157 onto which are discharged the matrices and space bands in the process of line composition. This in substance includes the features that relate to composing and line setting control. In addition to this, however, the present invention also includes control for the line casting operations of the principal machine.

*Elevator mechanism*

Attention is now directed to Figs. 1, 3, 5, 8, 16 and 17. The drive shaft 42 carries secured to it a worm gear 158 which is adapted to drive a worm wheel 159 fixed to the stub shaft 49 located below and at right angles to the drive shaft. A cam sleeve 52, Fig. 5, of the stub shaft 49 is adapted to be driven by the stub shaft through the medium of a tooth clutch 161 generally similar to the clutches 98 and 113 aforementioned. As best indicated in Figs. 10 and 11, this clutch 161 differs in one respect, however, from the other clutches. Instead of there being but one lever for disengaging the clutch there are two; namely, 162 and 163. Thus, the driven shaft 52 may be arrested in either of two positions spaced 180° apart from each other. As will be explained hereinafter in connection with the elevator safety mechanism, the release of lever 163 is effected upon the return of the delivery slide arm 224 after a delivery operation, while the release of lever 162 is effected at the instance of an elevator signal by the trigger 213. At each of these events the release of the respective levers 162 or 163 causes engagement of clutch 161 for a 180° revolution of the shaft 52.

A cam 164 secured for rotation with said driven shaft 52 engages a roller 165 carried by a bell crank lever 166 pivoted at 167 to the depending portion 57 of the framework. The other arm 168 of the bell crank 166 has pivotally secured to it one end of a push rod 169 the other end 171 of which is pivotally connected to one arm of another bell crank 172. In order to render said push rod resiliently yieldable it has intermediate its extremities a dash pot 173 and a coil spring 174 disposed to normally maintain said rod in extended position. The other arm of the bell crank 172 is pivotally connected to the lower end of an elevator shaft 175. In this manner the rotation of the cam 164 is adapted, through the linkage described, to raise and permit the lowering of the assembly elevator 156 through the shaft 175.

The proper time for raising the elevator 156 is when its assembly block 157 has received a full load of matrices 80 and space bands so as to be able to cast a full measure line. Any load that is too long must be rejected else it will lock the casting machine while one that it too short should also be rejected otherwise the mold will be unable to retain it. To safe-guard against either of these contingencies there is provided herewith a measuring mechanism and safety means indicated hereinafter as the short-long line interceptor. The preferred form of this device is illustrated in detail in Figs. 14 and 15. The bell crank 172 is provided with a segment 176 having a notch 177 in its periphery into engagement with which a pawl 178 pivoted at 179 is urged by a spring 203 when permitted to do so. The opposite end of the pawl 178 is pivotally connected to a depending arm 181 of a bushing 182 supported for pivotal as well as longitudinally slidable movement upon a vertical stud shaft 183. An arm 184 secured to said bushing 182 extends in the direction of the assembling elevator 157 with a slight upward incline and terminates with a vertical pin 185. Another arm 186 secured to the bushing 182 terminates with a fork 187 adapted to straddle the threads 188 of and be moved by a feed worm 189. The worm 189 is secured to a stub shaft 191 journaled in a yoke 192. A torsional spring 193 secured to one bow of the yoke 192 and to the worm 189 tends to normally maintain the latter member angularly in its extreme counterclockwise or starting position. On the opposite end of the shaft 191 is secured a ratchet wheel 194 which is rotated one tooth distance for each horizontal movement of the space band selector bar 195. Thus every time a signal is received for dropping a space band, a pawl 196 carried by the space band selector bar 195 in moving forward causes the rotation of the ratchet 194 one tooth distance while a holding pawl 190 maintains it against the tendencies of spring 193 until released. Arm 186 and its associated feeler arm 184 to which it is secured are normally maintained in the position indicated in full lines in Fig. 15, that is, before any spacebands are released. As the worm 188 is rotated, arm 186 is drawn leftwardly and the assembly, including arm 184, is then pivoted about shaft 183 in a clockwise direction.

The assembling block 157 affords a trackway into which the assembled matrices are received, while a measuring device is associated with the assembler slide 197 and is adapted to be moved along with the matrices 80 and serves as a visual guide to the operator for ending the line as well as for proper justification thereof. Secured to said slide is a clamp 198 the lower end of which carries a triangular plate 199 of a particular shape, materially significant, as will be indicated in the description of its performance. The vertical pin 185 of arm 184 is disposed in the longitudinal path described by the plate 199 during its movement while matrices are being assembled, but normally a trifle below the plane in which the plate moves as illustrated in Fig. 14 so that during composing operation the plate may pass above the pin.

This device intercepts the movement of the elevator when a line that is either too short to be expanded to measure or too long to be accommodated has been set up on the assembly block. Supposing a short line to have been set up and an elevator signal comes through for raising the block 157. In such case the stick 197 will only have advanced in the direction of arrow 201 to a point approaching but not reaching the pin 185. The pin 185 will be in one or another of the positions in its arcuate path depending on the number of space bands that have been released to comprise the particular line. This position varies from the solid line to the dotted line as indicated in the proportion of space bands from zero to the maximum available or usable. If in such a case enough space bands have been released so that their combined expansion is sufficient to expand the length of the line to full-line dimension then the pin 185 will have attained a position to be engaged by the plate 199 Fig. 15. If, however, an insufficient number of space bands have been so released the pin will operate vertically unobstructed by the plate. Thus it will be seen that as the composed line length increases the plate moves farther in the direction of the arrow and fewer space bands will suffice to accommodate the requirement of engaging the pin 185 with the plate 199. Conversely as the number of space bands in a particular line is increased a fewer number of matrices 80 will be accommodated due to the greater expansion of the space bands.

While the elevator 156 is down as in Fig. 14, the tooth 202 of the pawl lever 178 rests upon the peripheral surface of the bell crank segment 176 but as soon as the latter begins to revolve, the tooth will slip into the notch 177 as urged by spring 203, and the rear end of the pawl 178 which is connected to the bushing 182 will force the latter member upwardly provided, however, that plate 199 does not overlap the pin 185. If the pin 185 is overlapped by the plate the interference by the latter will prevent the bushing 182 from sliding upwardly and the pawl lever from entering into the segment notch 177. In opposite manner a short line with insufficient space bands, permitting of no engagement of the pin 185 by the plate 199 permits the pawl 178 to drop into the notch 177 to arrest the movement of bell crank 172. During such a condition the continued movement of the elevator cam 164 imparting a rotation to bell crank 166 causes a compression of spring 174 while piston 204 (Fig. 16) moves into the far end of its dash pot 173.

Suppose, however, instead of the line being too short, that it is too long. In that event, the plate 199 will over-ride the range of the pin 185 and will assume a position; for example, such as indicated in dotted lines in Fig. 15. In this case the expansion of the space bands constitutes no consideration since the line is already too long, hence the rear edge 205 of the plate 199 is approximately a straight line instead of being inclined as in the case of the forward edge 206. The pin 185 will then be permitted to rise behind the plate 199 affording thereby a similar interception of the bell crank and elevator 156. Thus, the only time that the elevator is permitted to deliver its charge is when the plate 199 overlaps the pin 185. The area represented by the surface of the plate thus constitutes an index of the expansibility of the space bands with respect to the length of line assembled.

During the time that the elevator 156 and its assembling block 157 are in transit further release of matrices 80 and space bands must be arrested otherwise they are discharged out of the chute onto the floor since the assembler block is not there to receive them. This interruption is automatically controlled in the present device by mechanism whereby when operation of the elevator is begun, the control tape 32, or rather the feed mechanism 33 therefor, is stopped. Particular reference is had to Figs. 2, 8, 16 and 17. When a signal comes through for operating the elevator mechanism, a particular selector bar 207 (Figs. 16 and 17) is selected and moves rearwardly as already explained in connection with matrix selector bars. This bar 207 differs structurally from the matrix selector bars 35 by terminating with a lug 210 as does the bar indicated in Fig. 9, and by having no push rod 36 in conjunction. As can be seen, the movement of the bail 62 will then raise the bar 207 bodily. This movement is permitted by the special off-set construction 208 which amply clears the transverse bar 77. In addition this elevator selector bar 207 is also supplied with two appendages one of which engages a lug 209 of a bent member 211 which in turn is secured to a shiftable rack 212, and the other of which engages a clutch release trigger 213 (Fig. 8). In its forward movement bar 207 moves rack 212 laterally while in its upward movement, upon the operation of bail 62 it effects the release of the trigger 213 which is pivotally connected to the clutch release lever 162 aforementioned and also illustrated in Fig. 10.

Rack 212 pivotally supports a third class lever 214 the free end 215 of which is adapted to close a set of spring contacts 216 through the medium of a longitudinally slidable switch arm 217. The force for actuating said lever is communicated to it by a bell crank 218, spring urged away from it by a spring 230, Fig. 17, but actuated to engage it when a revolving pin 219 cams against the lower arm 221 of the bell crank 218, Fig. 17. The lever 214 is provided with a notch 222 and is so designed that when the rack 212 is in its normal position and the bell crank 218 is actuated by pin 219, the upper arm 223 does not pass into the notch 222 but engages the shoulder 220 of the lever 214 causing it to be moved and through switch arm 217 close the contact springs 216. When the rack 212 moves into its actuated position then the arm 223 of the bell crank 218 registers with the notch 222 and thus arm 223 does not impart movement to the lever 214. During the normal stop position of the shaft 52, the pin 219 is in the upward position, approximately as shown in Fig. 17 so that the contacts 216 are normally closed as shown in Fig. 5*a*, but during the other stop position the pin 219 is out of the way thereby permitting spring 230 to withdraw end 223 of bell crank 218 from notch 220 and permitting the contacts 216 to remain opened. Immediately following an elevator signal the elevator selector bar 207 moves forward, as described, and as it is raised by the bail 62 the clutch 161 through trigger 213 and lever 162 is released and shaft 52 starts to rotate.

After the shaft 52 is rotated by the engagement of clutch 161 it proceeds 180° and is again stopped by the other clutch lever 163 as explained above. This second stop position is maintained pending a signal from the principal machine that the elevator 156 has been relieved of the matrices by the delivery slide, and that the machine is ready to proceed with another line composition. This signal is received from the delivery slide arm 224 in the following manner. The assembling elevator proceeds upwardly with its load of matrices 80 for casting a slug. When it reaches the top of its travel it releases the delivery slide arm 224 which is pivoted just below the frame of the elevator. This arm 224 while in its normal position maintains two L shaped control levers 225 and 226 in the position indicated in Fig. 8 but when released permits them to be pivoted into the position indicated in dotted lines in Fig. 14.

One of the arms 225 is secured to a bail 227 pivoted on a shaft 228. A link 229 is connected to the bail at 231, to a propelling spring without numeral, Fig. 16, and to one end of a first class lever 232 Fig. 16 which is suitably mounted on a stud shaft 233 secured in a wall 57, while the other end of the lever 232 is pivotally connected to a beam 234 the opposite end of which is bifurcated (Fig. 10). A fixed rod 235 passes between the forks 236 and thereby supports the free end of the beam 234 which has intermediate its extremities a pawl 237 spring urged in a counterclockwise direction to engage a depending leg 238 of the clutch lever 163. In moving to the right as viewed in Fig. 10 the pawl yields and passes under the leg 238 but in moving to the left it is adapted to engage the leg and thereby release the clutch 161 when shaft 52 has been arrested in its operative stop position (as distinguished from its normal stop position). In this manner the return movement of the slide arm 224 releases the clutch permitting another 180° revolution of the shaft 52 and the return of the assembling elevator 156 after having completed the delivery of a load of matrices to the mold.

When the assembling elevator is returning toward the conclusion of the performance, the bell crank lever 172 is restored to the normal position indicated in solid lines in Figs. 3 and 16. When this occurs a pin 239 projecting from the side of segment 176 of the bell crank 172 engages a depending portion 241 of a long slide bar 242 the other end 243 of which supports the bell crank 218 (Fig. 17) and pulls it longitudinally so as to dispose the bell crank 218 into the range of the switch lever 214. In this connection it will be noted that another member 244 projecting from the segment 176 is adapted to engage the depending portion 241 of the slide bar 242 when the elevator is up and the bell crank is in its dotted position. This latter performance pushes the slide bar 242 and the bell crank 172 connected to it out of range of engagement with the switch arm 217. The reason for this control of the switch 217 from the elevator mechanism is so that the restoring of the cam shaft 52 to normal by the movement of the delivery slide arm 224 and the consequent disposal of the cam pin 219 into contact closing position does not close the operating circuit but that engagement of pin 139 with depending portion 241 operates slide box 242 to draw bell crank 218 and its end 223 into engagement with shoulder 220, thus rotating the lever 214 to operate the sliding switch arm 217 to close the switch 217, the closing of the switch 216 thus being made to await the complete readiness of the assembling elevator 156 and block 157 thereby assuring that all of the several operating parts of the principal machine are in normal position and that the machine is ready to continue with the line composition.

The other of the two L shaped arms 226 is secured to a bushing loosely mounted on the shaft 228 Fig. 8. A leg 245 extends from this bushing and is normally disposed to clear a lug 246 integral with the long arm 247 of the bell crank 172 (Fig. 14), when the latter member is rotated during operation of the elevator. On the contingency, however, of the delivery slide arm 224 being withheld from returning, as by a jamming of the matrices 80 subsequently to their discharge and before delivery to the mold or for any other reason, this leg 245 urged by spring 243 will then continue to assume the position indicated in dotted lines, another operation of the elevator thereby being prevented and also the delivery of another load of matrices and the possible further complication that would otherwise ensue.

*Quadding-out mechanism*

Where a sentence is terminated in the middle of a line or where for any other reason it becomes desirable to complete a line with a blank space the usual practice is to release a suitable number of space matrices, such as em quads. In accordance with the present invention there is provided a mechanism illustrated in Figs. 14*a* and 14*b* whereby a line may be thus filled out with em quads automatically and in response to but a single signal.

This feature of the invention forms the subject matter of a divisional application Serial No. 720,409, filed April 13, 1934.

The em quad push bar 36 is provided with an extension 360 over which normally rests one arm of a T lever 361 and which lever is thereby restrained from responding to the clockwise torque imparted to it by spring 362. Over another arm of the lever 361 there is vertically disposed a wedge bar 363 capable of limited longitudinally slidable movement. The upper end of bar 363 is provided with a cam surface adapted to cooperate with a corresponding surface of a horizontally slidable bar 364 which carries an adjustable abutment clamp 365. A depending arm 366 is secured to the slide 197 and is adapted to engage clamp 365 at a predetermined time with respect to a line composition and to move bar 364 and thereby cam vertical bar 363 downwardly to rotate lever 361 counterclockwise and against the action of its spring 362.

In operation, when the em quad push bar 36 is selected and moved into the position indicated in dotted lines in Fig. 14*b* the extension 360 is thereby removed from interference with lever 361 and the latter member is permitted to rotate clockwise (Fig. 14*a*) to assume its dotted line position and to raise the vertical bar 363 at the same time camming horizontal bar 364 to the right. In this position the adjacent arm of lever 361 blocks extension 360 of the em quad push bar 36 preventing the return of the latter and causing it to be maintained in its dotted line position and to be actuated continuously by the bail 62. During this condition the T-lever 361 permits the contacts 367 to come ajar thereby breaking the control circuit of Fig. 5*a* and arresting the record reader.

When a sufficient number of em quad matrices have been assembled the arm 366 being secured to the slide 197 engages the abutment clamp 365 moving bar 364 to the left and bar 363 downwardly rotating lever 361 counterclockwise and closing the contacts 367. This permits extension 360 to move back into its solid line position and retain the T-lever 361 in its normal position. For different line lengths it is only necessary to adjust clamp 365 in accordance with corresponding markings on the bar 364.

*Multi-channel shift*

As is well known in the art, each type of letter or character matrix 80 is provided with a separate channel in the storage magazine. Among the several matrices are a few (the "em quad" for example) that are more frequently used than the rest, so much so that ofttimes the capacity of a single matrix channel is not sufficient to accommodate the number of occurrences that such a character may have in the course of a single cycle of operation. To remedy such a situation two channels are provided to contain each class of such frequently used matrices 80 and an alternative shift bar 249 which operates as an extra code bar as indicated in Fig. 5. This particular bar is so designed that it will interfere with none but the selection of the frequently used matrices and this is accomplished by providing it with notches in all but the positions in which the particular selector bars are concerned. There being two channels to be thus alternatively controlled there are accordingly two selector bars, one for each channel which in turn are controlled by a bar 249 operating to block one or the other of these selector bars in accordance with whether it is moved to one side or the other. The movement of the bar 249 is made regularly and alternately by operation of the elevator cam shaft 52 upon which is secured a gear 251 which engages and drives a larger gear 252, twice the size of the smaller 251 so that the latter makes two revolutions to each one of that made by the former. Crank 253 (Fig. 10) splined to the same shaft as the large gear 252 engages an elongated slot of one arm of a bell crank lever 254 of which the other arm 255 terminating with a disc 256 is articulated to the special code bar 249.

In accordance with this arrangement each half-revolution of the large gear 252 and lever 254 which occurs during the composition of one line of type, will prepare one or the other of the channels containing the frequently used matrices 80, and the succeeding half-revolution will prepare the other, since the code bar 249 as indicated above is equipped with a pair of projections 250 for each set of channels to be controlled, and since these projections are so spaced that during each of the two positions that the bar 249 assumes one of these projections 250 blocks one of the pair of selector bars while the other is not blocked but permitted to move into operative position.

The foregoing feature is claimed in copending divisional application Serial No. 724,025, filed May 5, 1934.

*Matrix-rail shift*

On most line casting machine matrices there are provided two types of letters or characters and usually where one type is a roman letter the other is bold face, italics or small caps. The purpose of this construction is to accommodate two classes of type in one and the same magazine and to thereby avoid transfer and delay such as would be necessary if two sets of matrices had to be used. In accordance with the known construction, the assembling block 157 is provided with two longitudinal rails 257 and 260, the upper one 257 (Fig. 22*a*) of which may be presented or withdrawn from the ingress end of the block. When a matrix is inserted to ride the upper rail one type of character is set up while if it rides on the other rail the other type of character is set up for registration with the mold casting chamber. By this process a single line of matrices 80 may be set up which includes any alternative arrangement of positions that may be desired. In other words where roman and italic faces are provided with a given set of matrices 80, any mixture of words or letters comprising the two types may be set up in a single line by simply introducing or withdrawing the movable rail 257 from the ingress and in this manner causing the following matrices to ride one or the other of the two rails.

This subject matter is an improvement upon the system disclosed in United States application Serial No. 704,378, filed December 29, 1933 and is claimed in copending divisional application Serial No. 670,251, filed May 10, 1933.

In accordance with the present invention there is provided a novel method of controlling this feature automatically so that by one or another of two special signals the slide on the assembly block may be prepared for the reception of the matrices 80 in one or another of the positions described. Primarily, there is provided a novel slidable rail mechanism which includes the longitudinally slidable rail 257 (Figs. 20 and 22*a*) spring urged into its left hand position and an operating lever 258 pivoted at 259 and maintained with loose joint connection to the depending portion 261 of the slide rail 257. The opposite end 262 of the lever 258 is adapted to be engaged by the upright arm 263 of a bell crank lever 264, the other arm 265 of which supports a cam roller 266. A cam 267 preferably secured to an individual stub shaft 268 is driven through a spring loaded tooth clutch 269 from a suitable source of power such as from the main drive shaft 42.

It will be more clearly understood by reference to Fig. 21 that a movable member 271 (Fig. 20) of the clutch 269 is provided with a beveled lug 272 and that two disengagement levers 273 and 274 positioned 180° from each other are adapted to engage it successively as it revolves. The lever 273 carries a trip arm 275 which is situated so as to be engaged by a pawl 276 carried by one of two selector bars which have been arbitrarily designated as the bold and roman selector bars 282, when that particular one is selectively operated. The other lever 274 carries a trip arm 277 which is similarly controlled but from the other of the two selector bars 282.

Another cam 278 carried by the stub shaft 268 is provided with two apexes 279 which are preferably of insulated material and are so timed with respect to the rail shift mechanism that after one of the selector bars 282 is operated and before the rail 257 has been shifted the control circuit is broken through the opening of contacts 281, Figs. 5*a* and 21, so as to arrest the further operation of the record reader 33. It will be understood that shaft 268 is geared down in speed so that the shifting of the rail 257 will be delayed a proper interval to permit all of the preceding matrices to settle properly. The cam 267 is also suitably timed as indicated in Fig. 21*a* for permitting of this delay which in turn necessitates the interruption of the record reader 33 as described above.

When a shift signal is received for presenting the slide rail 257 the proper bar 282 is selectively operated and its pawl 276 releases the clutch. This causes the shaft 268 to be rotated 180° when the other lever 274 stops it again. Meanwhile the cam 267 assumes one or the other of its two positions and imparts corresponding motion to the bell crank 264 while the arm 263 of the bell crank correspondingly moves the lever 258 to shift the slide rail 257.

A modified form of bold-roman shift mechanism is shown in Fig. 22 in which a slide rail 283 is provided having a spring 284 to urge it in one direction while a magnet 285 operating through a linkage of levers acts upon a roller 286 to urge it in the opposite direction. In this form there is no necessity for any other mechanism. The magnet 285 is controlled over a special circuit from a switch 287 which in turn is governed by two selector bars 282 such as were described in connection with the preferred form. One of these when actuated is operative to close the contact while the other when actuated opens it. Another method of providing the delay and one which is especially adapted to the modified structure of Fig. 22 is to precede the rail shift signal in the perforated tape with a suitable number of blank or non-operative signals which will serve merely to delay the unit. In this manner the same objects may be attained as by the delayed action of cam 268 in the preferred form aforementioned.

*Multi-magazine shift*

Figs. 12 and 13 illustrate the application of the present invention to line casting machines in which two complete magazines are used. This kind of machine is adapted to be employed where two styles of type are to be used or where for any other reason one magazine does not provide accommodation for all of the characters that it may be desired to use. The two types of principal machines illustrated in Figs. 12 and 13 respectively are both well known standard models. In Fig. 12 two magazines 288 and 289 are contained in a holder 291 which is pivoted at 292. A toggle 293 is controlled by a lever arm 294 and connects with the holder 291 as at 295. By pivoting the lever 294, the toggle joint is straightened or broken depending upon the direction of movement. A lever 296 pivoted at 297 is connected to the lever 294 by a link 298 and is provided at its opposite end with a cam roller 299. A cam 301 is secured upon a shaft 302 which may be similar to the stub shaft 268 and is similarly controlled by a pair of selector bars 303.

By means of this arrangement each shift signal operates to rotate the shaft 302 one-half revolution when it is again arrested. In accordance with the position at which the shaft 302 is brought to rest the cam presents one or another of two opposite points of its periphery against the roller 299. As illustrated, if the shaft is stopped by the upper clutch lever 304 it presents its apex to the roller 299 thereby pivoting the lever 296 counterclockwise, and the lever 294 clockwise, to straighten the toggle joint and align the lower magazine opposite the matrix chute 305. When, on the other hand, the shaft 302 is stopped by the lower clutch lever 306 the cam 301 presents its nadir or low portion to the roller 299 which effects a reverse movement in the train of the several levers to break the toggle joint 293 and align the upper magazine with the chute 305. But one set of matrix release rods 300 are provided with this type of double magazine equipment and that in turn engages a corresponding set of auxiliary release elements (not shown) that is adapted to be in operative engagement with the one of the several magazines whose discharge openings are brought into registration with the common chute 305. The release rods 300 are controlled by the bars 36 as described in connection with the preferred disclosure.

When applied to a principal machine such as the one illustrated in Fig. 13 the only changes or departures that are necessary from the previous description reside in the connecting levers, the same clutch and control mechanism being applicable. In this case a roller lever 307 is linked directly to a rack 308 which supports reeds 309 so as to shift them from the dotted line to the solid line position in accordance with the particular signal. As is clear from Fig. 13, there is provided in this model a separate chute 311 for each magazine and also a separate release rod 312. The lower ends of both release rods are adjacently positioned so that but a slight motion of the reeds 309 will serve to align them with one or the other of the sets of release rods. The two chutes 311 merge into one as at 313 and discharge onto the assembling block as in the preferred form.

The foregoing subject matter is claimed in copending divisional application Serial No. 721,-657, filed April 21, 1934.

*Removable keyboard*

Figs. 18 and 19 illustrate the removable keyboard which may be installed for the purpose of affording a manual control without affecting the features of the automatic device. The keyboard includes a supporting frame 314 and a plurality of pivoted keylevers 315 arranged in staggered relationship preferably corresponding to the standard typewriter keyboard practice. For each code bar 34 of the control mechanism there are provided two cooperative parallel bars 316 and 317 which are horizontally disposed for vertical movement parallelly above their corresponding code bar. As will be noted from Fig. 19 the keylevers 315 are horizontally and parallelly disposed at their foremost portions 318 where they over-lie the several parallel bars 316 and 317. Thus when any keylever is depressed it is adapted to engage all of the several sets of bars. One bar 316 of each set has cut therein notches 319 of varying lengths so as to leave projections 321 while the other bar 317 of each set is similarly cut but in opposite relation to the first so that where the former is provided with a notch 319, the latter is provided with a projection 321 and vice versa. Accordingly each keylever when depressed will impart a similar movement to one or the other lever of each set. At each end and pivotally supported between each pair of bars is a lever 322, the corresponding horizontal arms 323 of which are similarly bent at right angles to the main body portion but reversely each from the other on the same lever so as to engage by means of the bent portions 323 the bar 316 or 317 adjacent thereto. In this manner the depression of an uppermost bar through the toggle arrangement causes the presentation of the other bar of the set to the uppermost position. The several notches and projections of all of the sets of bars 316 and 317 are so arranged that upon the depression of each keylever there is set up an individual condition of the several bars.

The levers 322 are provided with a third arm 324 perpendicular to the others and a connecting link 325 joins the arms 324 of each set so as to equalize the movement thereof. The links 325 are provided at one end with pins 326' adapted to engage secondary levers 326, the other ends of which are suitably articulated to the main code bars 34. In this manner the position of each of the primary levers 322 is relayed to its corresponding code bar 34 as the same is induced by the keylevers 315.

Fig. 23 illustrates a modified form of record reader that is especially adapted to be installed in a device provided with a removable keyboard such as the one described above. The secondary levers 326 have a pair of parallel arms 327 extending therefrom and a transverse bar 328 passes through the several levers between the arms 327. The record tape 32 is advanced as in the preferred form but the feeler levers 329 differ structurally therefrom. Each feeler has a depending arm 331 and a horizontal arm 332 from the end of which extends in a vertical direction the feeler pin 333. An L shaped arm 334 is connected by flattened ball and socket arrangement as at 335 to each feeler so as to dispose its horizontal arm 330 opposite the bar 328. The extremity of the arm 330 is V shaped as is the adjacent side of the bar 328 while the ends of the arms 327 are cut at an angle so as to provide a flared entrance for the intervening space 336.

The cam shaft 47 supports for rotation therewith two cams 337 and 338. The cam 337 imparts a reciprocal motion to a bell crank lever 339 which carries a resetting crosspiece 341. This cam 337 thus withdraws the feelers 329 at each revolution of the shaft 47. The cam 338 similarly affects the bell crank lever 342 which is in turn articulated to the L shaped arm 334 and imparts a pivoted movement thereto as allowed by the ball and socket joint 335. When in accordance with a particular reading some of the feelers 329 are in the dotted line position and others in the solid line position, those in the former position will dispose the V shaped end of their corresponding arm 330 for entrance between the bar 328 and the upper arm 327 while those of the latter position will dispose them for entrance between the bar 328 and the lower arm 327. For each reading, the feeler levers 329 are correspondingly positioned and the arms 330 are forced into their respective places in their spaces 336 causing the levers 326 to assume one or another of their operative positions. The tape feeder, indicated in part only, as by the sprocket 344 may be of any suitable kind such as the one shown in the preferred form supra.

Thus is provided a record reading device which is especially adapted to the selector mechanism herewith disclosed and one that is capable of convenient and rapid installation and removal. It is to be noted as a further feature that the knife-edges of arm 330 as well as of bar 328 determine which of the levers 326 are to be moved at a definite and critical point, that is to say, that since these two members encounter each other by opposing knife-edges but a slight movement on the part of the feeler arms 329 is enough to assure a proper transfer of the record to the levers 326.

*Permutation shift*

In accordance with the present showing there are indicated but six code bars 34. The permutations thus afforded amount to but sixty-four whereas the number of functions that are required to be performed in devices such as the principal machines herein referred to, well exceeds that number. The accommodation is accordingly made in the following manner. Two of the sixty-four permutations afforded are made to operate a seventh code bar 345 (Fig. 9) thus doubling the effect of the remaining sixty-two simple permutations and raising the aggregate number of permutations to one hundred twenty-four.

Particular reference will be had to Figs. 2 and 9. The two selector bars 346 and 347 that are designated to perform the shift operation are preferably located at the extreme positions with respect to the plurality of selector bars 35. Both are structurally similar to the selector bar used to effect the elevator operation as indicated in Fig. 9 but their several cooperating members are formed symmetrically opposite each to each. The right hand shift lever 348 indicated in Fig. 9 is pivoted at 349. One end of it is provided with a lug 351 into which is inserted a screw 352 so as to afford a means of adjustment for controlling the angular movement of the opposite end. This screw is adapted to engage the bar 346 when the latter is raised by the bail 62. The opposite end of the lever 348 rests upon one arm of a bell crank 353 the other arm of which is suitably articulated to the seventh code bar 345 as at 354 (Fig. 9*a*).

When the bar 346 is selected and then raised by the bail 62 pursuant to its particular signal it causes a shifting of the code bar 345 in one direction, and correspondingly the raising of the selector bar 347 whose cooperating members are symmetrically opposite to those just described, will shift the code bar 345 in the opposite direction. It will be understood that the proper positioning of the seventh code bar 345 is a condition precedent to each function operation and also that a shift signal need not precede each operating signal but need only precede those signals which are predeterminedly allotted to the opposite position from the one in which the seventh code bar was previously positioned. The six regular code bars 34 are positioned by the six impulses of the standard six unit code while the seventh code bar is positioned in its right or left hand position by one of two permutations of positionment afforded by the six code bars 34. But since the selection of one of the selector bars is dependent upon the position of both the six regular bars 34 and the seventh bar 345 or, in a more general sense, since it depends upon the position of each of seven code bars, and since all seven of these bars may not be controlled by a six unit code of mechanical or electrical impulses, the positioning of the six 34 code bars is effected by one code signal and the positioning of the seventh bar 345 by another. Particular note is made of the fact that this structure and method of operation is especially designed to accommodate the use of the standard six unit code and that where it is desirable to depart from the standard practice and to adapt a seven unit code the same objects may be obtained by simply providing an additional or seventh feeler 45, code bar 35, and associate members. It is understood that the selector bar notches 71 that are in registration with the seventh code bar 345 are preferably somewhat wider than the other notches 71 so that in the case of a seventh bar shift signal either of the shift selector bars 346 or 347 may drop into selected position and thereafter afford sufficient clearance to the seventh code bar 345 so that the latter member may be shifted.

*Operation*

To assure a better understanding of the operation of the mechanism described in the foregoing disclosure, a complete cycle of performance will now be described such as might be effected by a typical set of signals representing a line of type to be cast. The beginning of a cycle to be taken for this example corresponds with the first letter of a normal line, it being understood that variance in different lines is merely a matter of different signals of operation and not any difference in general mode of operation.

The elevator 156 has just returned to its normal position, having delivered a load of matrices 80 to the casting mechanism in response to the final signal of a previous cycle, and the bell crank 172 has assumed its position as indicated in solid lines in Figs. 3 and 16. The final movement of bell crank 172, through the medium of pin 239, pulls slide bar 242 toward the left as viewed in Figs. 16 and 17 whereupon the bell crank 218 is moved into its effective position; that is, into the position in which it engages the switch arm 217 to cause the latter to close the contacts 216. The closure of these contacts establishes the circuit indicated in Fig. 5*a* energizing magnet 102 and thereby starting into rotation the shaft 47 which carries the record reader operating cams 132 and 133 as well as the code bar resetting cam 78. These cams are so timed with respect to each other that after cam 132 has permitted the feelers 45 to read the first record and before cam 133 has operated to transfer the reading, cam 78 has meanwhile reset all of the code bars. The code is then transferred from the feelers 45 to the bars 34 which may cause the selection of a selector bar 35 or else they may cause movement of the seventh code bar 345 anticipating to that extent the following signal which will select a selector bar 35.

Shortly after shaft 47 is started into rotation cam 119 carried by it releases the shaft 48 into rotation through the train of levers 114, 116, and 117. The latter shaft carries cam 88 which is timed to rock the bail 62 an instant following the selection of a bar 35 and to thereby thrust upwardly the corresponding push bar 36 that has been displaced by the aforementioned selection. The particular bar 36 by engagement with the matrix or space band release element of the principal machine, then effectuates the release of a corresponding matrix or space band which is discharged onto the delivery chute, such as 305 or 311, and thence onto the assembly block 157 in the usual manner.

In connection with the matrices 80 it will be recalled that they may be received in either of two positions by the assembling block 157, depending upon the position of the movable upper rail 257 when each matrix is delivered thereto.

In this manner each of the matrices and space bands is positioned on the block 157 until a proper load has been so accumulated after which the final signal of the cycle is received which is the elevator signal. If the load is too great or too small the interceptor mechanism is brought into play as described in connection with its disclosure, but if it is of proper length the elevator signal selects the elevator selector bar 207 which is then actuated by the bail 62 to release the elevator shaft clutch 161. In its forward movement pursuant to its selection, the bar 207 also moves the rack 212 forwardly causing the notch 222 to come into registration with the bell crank 218 thereby rendering ineffective the normal capacity of the latter member in maintaining closed the contacts 216. The circuit illustrated in Fig. 5a is then broken and the shaft 47 which operates the record reader mechanism 33 is thereby arrested.

The clutch 161 having been released, shaft 52 is rotated 180° whereupon the secondary clutch throw-out lever 163 again arrests the shaft. During this half-revolution, however, cam 164 acting upon roller 165 transmits motion through the elements 166, 169, 172, and 175, to raise the elevator 156, and the assembling block 157 carried thereon to the proper height for discharging the load of matrices onto the horizontal slide of the principal machine. At this point the principal machine operates to release the delivery slide arm 224 which in turn permits the L shaped lever 225 and its integral portion 227 through elements 229, 232, 234 and 237, to release the secondary lever 163, engaging the clutch 161 again to rotate shaft 52 another 180° and permit the elevator 156 and the above mentioned elements that are connected to it to resume their normal position. This finds all of the several parts at the starting point again ready to begin another cycle.

In the event, however, of any interference with the upward movement of the elevator 156 such as, for example, the intervention of the short-long line interceptor or any extraneous interruption, the force that is transmitted through cam 164 and the elements 166, 169, 172, and 175 is absorbed within the intermediate yielding member, the spring 174, bell crank 172 remaining in a position short of its clockwise extremity, while the L-shaped member 225 remains inert. This is so because the elevator 156 failing to rise to the line delivery level prevents the release of the line delivery slide because of interference of the delivery slide catch in accordance with the well-known linecasting machine construction. As a result of the failure of the delivery slide to move leftwardly, Fig. 1, bail 227 remains in the position illustrated in Fig. 8 while link 229 maintains the assembly 232, 234, and 237, Fig. 3 in its inactive condition as distinguished from its alternative condition where, by its movement rightwardly, lever 237 trips bell crank 163 as described above. Thus, as a result of the inactivity of the delivery slide, bell crank 163 is not tripped but continues to maintain clutch 161 in its disengaged condition, and since shaft 49 has completed but half a cycle or 180° of revolution, cam 164 tends to urge the linkage 172, 174, and 173 so as to maintain the elevator 156 in its line delivery level subject, however, to the interference or impairment thereof by the intervention of any foreign agency or through the intervention of the short-long line interceptor. In this manner, the assembling elevator is prevented from further operation conditioned upon the complete performance of the delivery slide.

The foregoing description of operation contemplates the use of a perforated record strip as a control medium operating directly upon the record reader of the unit. For obvious advantages where automatically controlled line casting machines are to be used extensively in a single office it may be highly desirable to employ the system of electrical control illustrated diagrammatically in Fig. 5b. In accordance with this system a control cam 370 is mounted upon the driven shaft 47 of the unit and is timed to close a pair of contacts 1370 toward the conclusion of each cycle of operation of the shaft. The contacts 1370 thus closed establish circuit 371 and cause to be energized the start magnet 372 of a tape transmitter which may be of the structure disclosed in U. S. patent to Kleinschmidt No. 1,632,297 except that it be provided with six unit accommodation instead of five as this patent discloses. When this occurs a complete six unit signal is transferred from the storage of the tape transmitter to the six magnets 145 of the control unit following which the operation of the latter continues much the same as described above in connection with the direct tape control method of operation. It will be noted that by this system of operation peak operating efficiency may be attained since the sole limiting factor in this case is the capacity of the line casting machine. The cam 370 being connected to the control unit which is gear driven from the principal machine at maximum capacity, in turn controls the tape transmitter to transfer a new signal as soon as the unit is ready to receive it.

It will be apparent that the present invention including its several auxiliary parts is capable of alteration and modification. Accordingly the scope of the invention is not intended to be limited to the accompanying drawings nor the foregoing description but rather to include all structures that may lie within a reasonable construction of mechanical equivalence as defined by the following claims.

What is claimed is:

1. The combination with a line casting and composing machine of a control mechanism including a plurality of matrix release elements, a set of permutation bars operative to select one of said release elements for operation, a permutation bar setting mechanism, means operated mechanically in accordance with the perforations in a record strip for controlling said setting mechanism, and a source of mechanical power for actuating the aforementioned bars, composing machine, and the selected one of said elements.

2. The combination with a line casting and composing machine of an automatic control device including a record reader, a plurality of setters operable by said record reader, a plurality of code bars adapted to be positioned by said setters, a set of function bars one of which is selected for operation with each permutated arrangement of said code bars, a common actuator for operating the selected one of said function bars, a power take-off mechanism including a driving train and a driven train, and timing means for operatively connecting said driving train to said driven train to cooperatively actuate the several elements included in said control device.

3. The combination with a line casting machine of a control mechanism including a plurality of matrix release elements, a selector mechanism for selecting and operating said elements, a device controlled in accordance with a permutation code for controlling said mechanism, said line casting machine including a matrix assembly block, a delivery slide for conveying assembled matrices to a casting position, an elevator for raising said block to the level of the delivery slide, and a safety mechanism including a resilient linkage, an interceptor, and means to check the response of said elevator to said resilient linkage in the event of a predetermined condition of operation of said interceptor.

4. A line casting and composing machine including a magazine, a plurality of matrices stored in said magazine for selective release, a plurality of release rods each individual to a class of said matrices, a control mechanism disposed in front of and extending partially under said magazine including a plurality of selector bars arranged for parallel longitudinal movement, each corresponding to and operative to communicate its selective movement to one of said release rods, a set of code bars selectively positionable to condition one of said selector bars for operation, a permutation code controlled mechanism for positioning said code bars, an actuator for operating the selected one of said selector bars, and a rotary driving means for said actuator including a bail for cyclically returning the selected one of said bars whilst momentarily permitting its associated rod to remain in its operative condition.

5. A line casting and composing machine including a magazine having a plurality of channels, a plurality of classes of matrices each class of which is retained in and appurtenant to one of said channels, matrix release means individual to each of said channels, a plurality of function elements one each of which is operative to actuate one of said release means, automatic selecting means for selecting and operating said function elements, and removable manual control means for selecting said function elements including a set of individual elements adapted to be superimposed upon said function elements and having operative connection therewith.

6. In a line casting and composing machine, a matrix assembling mechanism, a line casting mechanism, an elevator for delivering matrices from the level of said assembling mechanism to the level of said casting mechanism, an elevator operating mechanism, a delivery slide arm for conveying said matrices from said elevator to said casting mechanism, and means conditioned by said delivery arm and operative upon said elevator operating mechanism for preventing the return of said elevator to the level of said assembling mechanism.

7. In a composing and line casting machine, an automatic control mechanism including means for releasing matrices, means for conveying assembled matrices from the place of assembling to the place of line casting, a common source of power for supplying the motive force to all of the elements of said machine including a power take-off mechanism for operating said control mechanism having a driving branch for operating said matrix releasing means and a driving branch for operating said conveying means, clutch mechanism for establishing driving connection between said power take-off mechanism and said driving branches, and control means for rendering each of said driving branches inoperative during the performance of the other of said branches.

8. In an automatic control mechanism for line casting machines, a power take-off mechanism, an elevator, mechanism having positive clutch engagement with said power take-off mechanism for raising said elevator, and an interceptor operative to prevent the attainment of said raising mechanism, and a yieldable linkage to absorb the motion of said raising mechanism within said yieldable linkage in the event of untimely clutch engagement.

9. In an automatic control device for line casting machines, a plurality of function bars, a signal controlled mechanism, a selector mechanism operative to be conditioned by said signal controlled mechanism to cause the selection of one of said function bars, a power take-off mechanism, and normally inert means operated by said power take-off mechanism following a selection to actuate a selected one of said function bars to perform its particular function.

10. An automatic control device for installation upon a principal machine having keyboard manual control which includes a mechanism to replace the keyboard, a plurality of function elements in said mechanism for function control, and a power take-off for operating said mechanism and elements of said mechanism and supplied with power from said principal machine.

11. A line casting machine including composing mechanism, slug-molding mechanism, and automatic control mechanism, said control mechanism including a plurality of function bars each of which is capable of being selectively conditioned by said control mechanism to effect a particular performance, and means individual to each of said bars whereby they may be operated manually.

12. A line casting machine comprising a composing mechanism, a slug casting mechanism, and a control mechanism including a set of record feelers, a set of code bar setters operated by said feelers, a set of code bars positioned by said setters, said setters being operative to afford an overlap of performance between said feelers and said code bars, and a plurality of function bars adapted to be individually selected by the positionment of said code bars and to effect the ultimate operation of said composing mechanism and said slug casting mechanism by direct mechanical control.

13. A line casting machine including a composing mechanism, a control mechanism including a plurality of function bars individually selectable to perform a particular function in the operation of said machine, a set of selector bars effective to select one of said function bars for operation, and a selector mechanism adapted to position said selector bars and operated electrically by code signals or mechanically by code perforations upon a record strip.

14. A line casting machine including a composing mechanism and a control mechanism, said control mechanism including a plurality of function bars individually selectable to cause a particular function in the operation of said machine, a set of selector bars effective to select one of said function bars for operation, and a selector mechanism to position said selector bars, said selector mechanism being alternatively responsive to mechanical means controlled by a perforated record strip, electrical control signals, and manual manipulation.

15. A line casting machine including a composing mechanism, a slug casting mechanism, and an automatic control mechanism, said control mechanism including a signal responsive selector adapted to cause the operation of said composing mechanism in response to electric code signals, mechanically to the perforations in a control form, or to manual control.

16. In a composing machine, a plurality of matrices, an assembling block for said matrices, a plurality of expansive bands, individual means for releasing said bands and said matrices onto said block, a delivering mechanism for conveying said block and matrices assembled thereon, and a measuring device operative in the event of overloading or underloading of said block to prevent the operation of said delivering mechanism which includes a mechanism blocking lever, an oscillating feeler lever angularly positionable in accordance with the number of said expansive bands released, a triangular plate longitudinally movable in accordance with the total number of matrices released so as to approach said feeler lever, and means including said measuring device whereby the interference of said plate and said feeler prevents the interposition of said blocking lever, but the non-interference thereof permits it to interpose into the path and prevent the operation of said delivering mechanism.

17. The combination with a line casting and composing machine of a control mechanism including a permutation selector mechanism, means to control said mechanism in accordance with perforations in a record strip, and a common source of mechanical power for operating said machine, mechanism, and control means.

18. In a line casting machine, a selective control mechanism including means for automatically setting said control mechanism in accordance with a perforated record, and means for manually operating said machine through the instrumentality of said control mechanism.

19. In a line casting machine, a selective control mechanism including a plurality of automatically selectable function bars, means for automatically conditioning one of said bars for operation in accordance with a perforated record, and means for manually operating one of said function bars.

20. In a line casting machine, a selective control mechanism including a plurality of selectable function bars, a set of notched code bars operative by permutative positionment to select said function bars individually in accordance with predetermined control conditions, including means for automatically positioning said code bars, and means for manually positioning said code bars.

21. The combination set forth in 20 wherein said manual positioning means include key levers individually operative to position said set of code bars.

22. In an automatic control mechanism for line casting machines, a plurality of actuators, a set of code bars adapted by permutative disposition to select each of said actuators individually, a setter for each of said code bars having a pair of arms, a fixed member interposed between said arms, a set of record feelers, and a set of transfer members articulated to said set of feelers each affording an interposing portion opposite said fixed member at one side or the other thereof in accordance with the position of said feelers.

23. The combination set forth in claim 22 in which said fixed member and said interposing portion are provided with opposite knife edges.

24. In a selecting device, a plurality of permutation members, a series of elements to be selected according to the setting of said members, a second series of elements one corresponding to each of the first series, means to operate a selected one of the first series to condition a corresponding one of the second series, and means to lock the conditioned element of the second series in conditioned position while the corresponding element of the first series is returned to normal.

25. In a record reader, a series of feelers adapted to engage a perforated form and assume positions in accordance with the perforations, a knife edge carried by each feeler, a series of code elements one corresponding to each feeler, a stationary knife edge, and means to bring the feeler knife edge into alternative engagement with the stationary knife edge and to thereby set the code elements.

26. In a system for automatic composing, a composing machine, a remote record reader, solely electrical connection between the composing machine and the record reader, and means operated by the composing machine to phase the operation of the record reader cyclically in accordance with the speed of the composing machine.

27. In combination with a type casting machine, a matrix assembling and delivering mechanism, a plurality of permutation bars, means operated entirely mechanically in accordance with the perforations in a tape for operating said permutation bars, and means selected upon the operation of the permutation bars for controlling the mechanical operation of the matrix assembling and delivering mechanism.

28. In combination with a type casting machine, a plurality of matrix assembling and delivering elements, a plurality of permutation bars, means operated entirely mechanically in accordance with the perforations in a control form for operating the permutation bars, a selector bar individual to each matrix, assembling and delivering elements operated upon the selection of said permutation bars in various combinations for selecting for operation one of said elements, and means operated in timed relation to said permutation bars for actuating the selected element and causing the discharge of the matrix individual thereto.

29. In a line casting and composing machine, a magazine having a plurality of matrix storage channels, individual release members for each of said channels for releasing matrices, a set of release reeds one for each of said members for actuating them thereby, and an automatic control unit for actuating said reeds including a set of individual engagement members, a common actuator, a set of selectable elements whereby the selection of one of said elements conditions a corresponding engagement member to be operated upon by said common actuator to engage a corresponding one of said release reeds and to thereby effect the release of a matrix, and means for maintaining said engagement members conditioned momentarily while said selectable elements are restored to their normal position.

30. An automatic control mechanism for line casting machines including a mechanical driving source, a matrix elevator, elevator operating mechanism between said source and said elevator, a yieldable linkage within said operating mechanism for absorbing the operative motion in the event the elevator is obstructed, and means for checking the return action of said linkage.

31. In a line casting and composing machine, a matrix storage magazine, a plurality of matrix release elements, a member for supporting a plurality of matrices in assembled relation, an automatic control mechanism including means for actuating said release elements, means for acting upon assembled matrices, and a common actuator operative upon both of said means.

32. The combination with a line casting machine of a control mechanism including a plurality of matrix release elements, a selector for selecting and operating said elements, a device operative in accordance with a permutation code for controlling said selector and said line casting machine, a delivery slide for conveying assembled matrices to a casting position, an elevator for raising the assembled matrices to the level of the delivery slide, a spring helix longitudinally compressible through which power is transmitted to said elevator, and a mechanism responsive to a particular permutation code for controlling the operation of said elevator through said resilient linkage.

33. A linecasting and composing machine including a magazine, a plurality of matrices stored in said magazine for selective release, a plurality of release rods each individual to a class of said matrices for releasing them thereby, a control mechanism, including a plurality of selector bars each corresponding to and operative upon one of said release rods, a set of code bars selectively positionable to condition one of said selector bars for operation, a permutation code controlled mechanism for positioning said code bars, a continuously rotating shaft, an actuator for operating mechanically the selected one of said selector bars, and means responsive to the control mechanism for rendering said shaft effective to actuate said actuator.

34. In a linecasting and composing machine, an elevator for raising assembled matrices, an automatic control unit responsive to signal conditions for initiating the performance of said elevator, and means for suspending the further effectiveness of said unit upon a failure of the elevator in completing its ascension.

35. In a linecasting and composing machine, a conveying mechanism including a primary operating portion and a secondary operating portion, means for preventing the performance of said secondary operating portion conditioned upon a predetermined accomplishment of said primary operating portion, and means for preventing the further operation of said primary operating portion conditioned upon the complete performance of said secondary operating portion.

36. In a linecasting machine, an elevator for raising assembled matrices to a predetermined level, a delivery slide for conveying the assembled matrices upon their arrival at said level, and means effective in the event of a failure on the part of said elevator in attaining said level for preventing the further operation of said elevator.

37. In a linecasting machine, a matrix composing mechanism and a matrix conveying mechanism, means for arresting the performance of said matrix composing mechanism during the operation of said conveying mechanism, and means for suspending the further operation of said composing mechanism in the event of a frustrated performance of said conveying mechanism.

38. In a linecasting machine, a composing mechanism, a conveying mechanism, an automatic control unit, a power driven mechanism for operating said composing and conveying mechanisms under supervision of said control unit, and an intercontrolled means operative in the event of a deficient performance on the part of said conveying mechanism to suspend the further operation of said composing mechanism.

39. In a linecasting machine, a composing mechanism, a conveying mechanism, a signal controlled mechanism, a power train for actuating said composing and conveying mechanisms under the control of said signal control mechanism, and means operative during the performance of said conveying mechanism for suspending the operation of said composing mechanism pending a completed operation of said conveying mechanism.

40. In a linecasting machine, a matrix composing mechanism, a matrix conveying mechanism, a driving train for actuating said composing mechanism, a driving train for actuating said conveying mechanism, a signal controlled selecting device for initiating the operation of each of said trains in accordance with predetermined signals, and a disabling means operative to suspend the performance of said composing mechanism at the initiation of movement of said conveying mechanism and to resume its performance conditioned upon the fulfillment of operation of said conveying mechanism.

41. In a linecasting machine, a composing mechanism including a plurality of classes of character carrying matrices, a set of releasing members one individual to each of said classes, an automatic control unit for selectively actuating said members in accordance with predetermined signals, a conveying mechanism including an elevator for raising assembled matrices from the point at which they are assembled to an upper level at which they are laterally conveyed, a delivery slide operative after said elevator has attained its upper level to laterally convey the assembled matrices to a casting position, and a disabling device operative to suspend the performance of said releasing members from the time at which said elevator is initiated into operation until thereafter when the delivery slide has been started into operation and said elevator has returned to normal or assembling position.

42. In a composing machine, a plurality of character bearing members individually selectable, a corresponding plurality of keylevers, a permutation device composed of a fewer number of permutable elements than the number of said members, a plurality of selectable elements to be individually conditioned under the control of said permutable elements, and means to release each of said members by the actuation of its corresponding keylever operative through the medium of an associated one of said selectable elements.

43. In a linecasting and composing machine, a plurality of classes of matrices to be selectively released, a corresponding plurality of escapement release means, an automatic control mechanism for selectively actuating said means, including a plurality of actuators, a plurality of actuator conditioning members, and means for restoring said conditioning members while permitting said actuators a prolonged period of effectiveness.

44. In a linecasting and composing machine, a plurality of classes of matrices supported for selective release to be gravitated into assembling position, a corresponding plurality of release escapements for engaging and releasing said matrices, a release rod individual to each of said escapements, and an automatic control unit for actuating said rods in accordance with stored selecting signals including means for prolonging the action of said rods so as to afford sufficient time to the matrices in gravitating including a common actuator effective upon the selected one of any of said rods, and rotary actuating means therefor.

45. The combination set forth in claim 44 including a selectable bar, and a push bar individual to each of said rods, and means for delaying the restoration of said push bar after its actuation so as to prolong the release actuating period.

46. An automatically controlled device for the replacement of keyboard controlled mechanisms including a plurality of function elements corresponding in number and application to the manual keylevers of a keyboard, a record reader responsive to the perforations in a tape for selectively conditioning said elements, a common actuator for operating the selected ones of said elements, and a power take-off mechanism for operating said record reader and actuator.

47. In a linecasting and composing machine, an automatic control unit responsive to signals for initiating various functions of the principal machine comprising a mechanism receiving mechanical power, a plurality of subordinate mechanisms having driving branch connections with said first mentioned mechanism, an electromagnetic element for initiating each cycle of operation of said control unit, a plurality of circuit breakers associated with said subordinated mechanisms, and a control circuit embracing said element and said circuit breakers for permitting said elements to be operatively effective only upon the proper condition of each of said subordinated mechanisms as manifest by their associated circuit breakers.

48. In a linecasting and composing machine, a composing mechanism including a plurality of matrix releasing means, a matrix assembling mechanism and matrix conveying mechanism, an automatic control unit for initiating the functions of said composing mechanism under the control of signals including a plurality of function performing elements, means operated mechanically in accordance with received signals for conditioning each of said elements selectively, and a single source of mechanical power for actuating the several performing elements of each said composing mechanism and said control unit.

49. A linecasting and composing machine including a composing mechanism having a plurality of matrix release reeds, an automatic control unit including a plurality of selectable actuators individually conditioned for operating said reeds, a conveyor mechanism also under the control of said unit for moving assembled quantities of matrices from certain locations with respect to said composing mechanism, and a common source of mechanical power for operating said composing mechanism, said conveying mechanism, and conditioned ones of said actuators.

50. In a linecasting and composing machine, a matrix assembling mechanism, an elevator for moving matrices from said assembling mechanism, a delivery slide for removing assembled matrices from said elevator, an automatically controlled device for operating said elevator, and means conditioned by said delivery slide for preventing the return of said elevator to the assembling level.

51. In a linecasting and composing machine, an elevator for moving assembled matrices from a line composing level to a line casting level, a delivery slide including an operating arm, release means responsive to predetermined operation of said elevator for releasing said operating arm, and means responsive to a movement of said slide operating arm for permitting the return of said elevator to said line composing level.

52. In a linecasting and composing machine, a matrix assembling mechanism and a matrix conveying mechanism, an automatic control unit for initiating the performance of various functions of said mechanisms including a record reader, an elevator operating mechanism, and a selector operating mechanism, a driving train for said record reader and each of said control unit mechanisms, an electromagnetic device for initiating the performance of said record reader, a circuit breaker associated with said elevator operating mechanism, a circuit breaker associated with said selector operating mechanism, and electrical circuit means embracing said electromagnetic device and said circuit breakers for conditioning said electromagnetic device to initiate the performance of said record reader under the control of said circuit breakers.

53. In a linecasting and composing machine, a plurality of matrix release elements, a corresponding plurality of selectable conditioning elements each cooperating with one of said release elements, means for selectively conditioning each of said conditioning elements in accordance with an individual code, a common actuator for each of said release elements effective to impart motion to conditioned ones of them, and key tabs associated with each of said conditioning elements including labels for indicating the character of the matrices with which each is associated and for constituting means for manual manipulation of said elements.

54. In a linecasting and composing machine, an automatic control unit for initiating the various functions of said machine including a principal operating shaft having cyclic rotation coincident with each functional operation, a selector mechanism including a set of selecting electromagnets conditioned by code signals for controlling the performance of said unit, a transmitting distributor for issuing electrical code signals to said electromagnets including a distributor start magnet, a control circuit for said start magnet, and a circuit breaker associated with said operating shaft for energizing and deenergizing said start magnet in accordance with each complete rotation of said principal operating shaft.

55. In an automatic control mechanism for initiating the performance of a slug casting and composing machine, the combination with a mechanical driving mechanism of a matrix conveying device, an operating mechanism for said device receiving power from said driving mechanism, and a yieldable connection within said operating mechanism including a spring compression element and a dash-pot for checking the return movement of said element said yieldable connection being operative to absorb resisted movement with a buffer action in the event said conveying device is obstructed.

56. In a mechanism, a plurality of controlling members operable between two alternative positions, a corresponding plurality of elements movable concurrently by said members in a direction longitudinal of their lengths from one position to another, a cam operable by a source of mechanical power for invariably actuating all of said elements at right angles to said longitudinal direction, and a plurality of controlled members actuated or not actuated by said cam through said elements moving in a direction at right angles to the longitudinal direction and maintained in their actuated or non-actuated positions after said elements are withdrawn.

57. In a tape sensing mechanism, a feeler lever for sensing the presence or absence of a perforation in a tape, and a transfer element carried by said feeler lever and movable independently thereof.

58. In a selector mechanism, a set of selecting members to be variously positioned for effecting a selective conditioning to one of a plurality of selectable devices, a set of code receiving elements, means for simultaneously imparting motion to said elements for causing them to assume positions of a code in accordance with transverse rows of perforations in a perforated strip, and cam means for moving said elements simultaneously to impart their assumed positions as determined by the perforations to said selecting members.

59. In a mechanical selecting apparatus, a set of code receiving and transferring elements, means for permitting said elements to be moved concurrently to assume the various positions of a code, in accordance with transverse rows of perforations in a perforated tape, and means for moving said elements concurrently for transferring the assumed positions as determined by the perforations to associative selecting members.

60. In a mechanical permutation code selecting apparatus, a set of code transfer elements including means for moving said elements simultaneously to impart to them a code combination setting, in response to various rows of perforations in a perforated tape, and other means for thereafter moving said set of code elements simultaneously for communicating the setting as determined by the perforations to the associative selective members.

61. In a mechanical selecting apparatus, a controlling member operable between each of two positions, a transfer lever operable by said controlling lever in a direction longitudinal to its length, a cam operated by a source of mechanical power for actuating said transfer lever perpendicularly to its length, a controlled member positioned by said cam acting through said transfer lever and imparting motion to it in a direction perpendicular to its length, and means to maintain said controlled member in each of its positions until a subsequent perpendicular motion is imparted to said transfer lever by said cam.

62. In a mechanical permutation device, a controlling member selectively operable between two alternative positions, a transfer lever movable by said controlling member in a direction longitudinal of its length, a cam rotatable by a source of mechanical power for actuating said lever in a direction transverse to said longitudinal direction, and an alternatively positionable member controlled by said lever and moved into either of its positions by said cam through the medium of said lever moving in said transverse direction.

63. In a keyboard controlled apparatus, a plurality of function initiating elements arranged in a given sequence to be manually controlled, a corresponding plurality of key actuators each key of which relates to one of said initiating elements, and means for correlating each of said keys with a corresponding one of said elements independently of the sequence arrangement of said keys and said elements.

64. A combination set forth in claim 63 in which said means comprises a plurality of pairs of bars, longitudinally shiftable elements under the control of each of said pairs of bars, and means for translating each longitudinal movement to a corresponding actuating movement of one of said function initiating elements.

65. In a linecasting and composing machine, an automatic control unit, a matrix conveying mechanism, an element selectable in response to a conveying mechanism initiating signal, a control circuit for determining the operative condition of said control unit, and a conditioning member and a cam carried by said conveying mechanism responsive to its operative condition for opening said control circuit and suspending further performance of said control unit, said means being responsive to the completed performance of said mechanism for reestablishing said circuit and restarting said control unit into operation.

66. In an automatic unit for controlling and initiating the various functions of a principal keyboard actuated machine, the combination of a power driven mechanism, a signal responsive device associated with said automatic unit, a pair of contacts controlling the operation of said signal responsive device, a member normally held to close said contacts and spring urged to permit said contacts to come ajar, a cam carried by said mechanism, a lever actuated by said cam, and means responsive to a certain actuation of said signal responsive device for enabling said lever under control of said cam to maintain said member in its contact closing position and responsive to another actuation of said device for disabling said lever.

67. In an automatic control mechanism, a conditioning mechanism including in combination a single revolution cam, a lever reciprocated cyclically by said cam, a function performing element having a clearance portion near said lever, and means responsive to signal conditions received by said control mechanism for moving said element to accordingly present or withdraw its clearance portion whereby to correspondingly disable or enable the performance of said lever.

68. In a linecasting and composing machine, an automatic control unit comprising a tape sensing mechanism and a plurality of actuators individually responsive to a perforated signal in a tape, an electromagnet for controlling the continued operation of said tape sensing mechanism, an elevator for moving assembled matrices from a composing level to a casting level in response to the operation of one of said actuators, a mechanism including a cam for communicating power to move said elevator, and a device including a circuit breaker for controlling the energization of said electromagnet conditioned by the disposition of said elevator and actuated by said cam.

69. In a selector mechanism, a set of code bars having permutably arranged lug and notch attributes, a plurality of selectable elements traversing said bars and disposed opposite said lug and notch attributes, a power train having start-stop cyclic operation, means responsive to signal control and actuated by said train for communicating a setting to said code bars for affording a selective clearance to one of said selectable elements, a restoration member cyclically actuated by said train for returning selected ones of said elements to their normal position following each cycle, a plurality of function members each associated with one of said selectable elements and adapted to be operatively conditioned by a selective movement thereof, and means for maintaining said function levers in their operative condition for a predetermined time interval while their associated selectable elements are cyclically restored.

70. In an automatic selector mechanism, a set of permutably movable code bars having notch and lug attributes and arranged in parallel alignment, a plurality of selectable members associated with said bars and disposed transversely thereof, said members adapted to move perpendicularly of said bars in response to their individual selection, a set of function elements one associated with each of said members and adapted to move first parallelly with said members thence perpendicularly thereof in accordance with their selection and operation, and means for detenting the return movement of said elements to permit the cyclic restoration of said members during the operation of said elements.

71. In a device for automatically actuating a keyboard or the like, a plurality of actuators each capable of assuming an idle condition and a selected condition, a mover having cyclic operation and effective to operate each of said actuators upon encountering the latter in its said selected condition, a plurality of individually selectable elements, a set of coded members for selecting said elements, means timed in relation to said mover for changing the position of said elements as they are selected by said members and through them of moving associated actuators from their said idle condition to their selected condition, and means for returning said selectable elements while associated actuators are still under the influence of said mover to effect an overlap.

72. In a record reader, a set of pivoted feelers for sensing the presence or absence of code perforations in a control form, and a set of transfer elements each one pivotally articulated to an associated one of said feelers, a dependent mechanism, and means for imparting a code setting to said dependent mechanism by movement of said elements independently of the feelers.

73. In a selecting apparatus, a set of sensers movable collectively toward a code storage device to receive a setting therefrom, a set of selecting members to be variously positioned for effecting a selective condition to one of a plurality of selectable devices in accordance with said sensers, and means carried by said sensers and movable during their period of engagement with said storage devices to impart a setting to said set of selecting members.

74. In a selecting apparatus, a set of pivotally supported tape sensing elements, means to move said elements intermittently into engagement with a perforated tape, a plurality of selectable devices, a set of selecting members permutably positionable for conditioning said devices individually, and means carried by said sensing elements and movable independently thereof for conditioning said selecting members to determine operation of the selectable devices.

75. In a mechanical selecting apparatus, a set of code receiving elements, a set of code transferring elements each associated with one of said code receiving elements, means to move said code receiving and code transferring elements to assume various position of a code, and means for moving said transferring elements solely for communicating said assumed positions to a subjective mechanism.

76. In a mechanical permutation code selecting apparatus, a set of selecting members, a set of code sensing and transfer elements, means for moving said code sensing elements towards a perforated tape to impart to the code sensing and transfer elements a code combination setting, and other means for thereafter moving said transfer elements simultaneously to communicate said setting to said selecting members.

LOUIS M. POTTS.